US005503514A

United States Patent [19]

LaManna et al.

[11] Patent Number: 5,503,514

[45] Date of Patent: Apr. 2, 1996

[54] CARD EMBOSSING MACHINE AND METHOD

[75] Inventors: Richard J. LaManna, Whippany, N.J.; Edward Cucksey, Upper Nyack, N.Y.; Leo Kull, West Caldwell, N.J.; Keith Ashley, Clark, N.J.; Igor Pankiw, Linden, N.J.; Phillip Roth, Wallington, N.J.

[73] Assignee: National Business Systems, Inc., Paramus, N.J.

[21] Appl. No.: 362,752

[22] Filed: Dec. 22, 1994

Related U.S. Application Data

[63] Continuation of Ser. No. 167,070, Dec. 16, 1993, abandoned, which is a continuation of Ser. No. 534,481, Jun. 7, 1990, abandoned, which is a division of Ser. No. 318,961, Mar. 6, 1989, Pat. No. 4,969,760.

[51] Int. Cl.[6] .......... B65G 65/00

[52] U.S. Cl. .......... 414/753; 198/468.2

[58] Field of Search .......... 414/749, 751, 414/753, 226, 786; 901/16, 21; 74/490.09; 198/468.2, 803.9

[56] References Cited

U.S. PATENT DOCUMENTS

| | | | |
|---|---|---|---|
| 4,088,216 | 5/1978 | LaManna et al. | 400/130 |
| 4,255,073 | 3/1981 | Schöttle | 414/32 |
| 4,318,340 | 3/1982 | Shenoha et al. | 101/27 |
| 4,566,346 | 1/1986 | Petiteau | 901/16 X |
| 4,796,413 | 1/1989 | Howe | 414/753 X |
| 4,972,574 | 11/1990 | Isono et al. | 74/479 PH |
| 4,995,501 | 2/1991 | Lundstrom | 414/226 X |

FOREIGN PATENT DOCUMENTS

| | | |
|---|---|---|
| 0142635 | 8/1984 | European Pat. Off. . |
| 8501277 | 3/1985 | WIPO . |

*Primary Examiner*—Donald W. Underwood

*Attorney, Agent, or Firm*—Antonelli, Terry, Stout & Kraus

[57] ABSTRACT

An embossing machine and method is provided in which the mass of the carriage assembly carrying the card to and from various operations in the machine is significantly reduced by the utilization of a card carrying carriage mounted for movement in one direction from side to side on the machine via a stationary motor. The carriage is mounted on a guide bar which, together with the carriage, moves from the front to the back of the machine via a stationary motor. A new card supply hopper is arranged to stack cards vertically and feed them to the carriage one-by-one as the carriage approaches the hopper. An embossing assembly is operated by a single interposer arranged in a crank drive or two interposers arranged between actuating levers and the rams of associated male and female embossing wheels. A topper assembly minimizes foil usage by winding up only that foil which has been used during the topping of the previous card. The embossed and topped card is fed to a stacking assembly either through an arrangement of wires which causes the card to waterfall into a stacker channel or to slide into contact with a pivoting loader which pivots the card into a stacker channel.

28 Claims, 20 Drawing Sheets

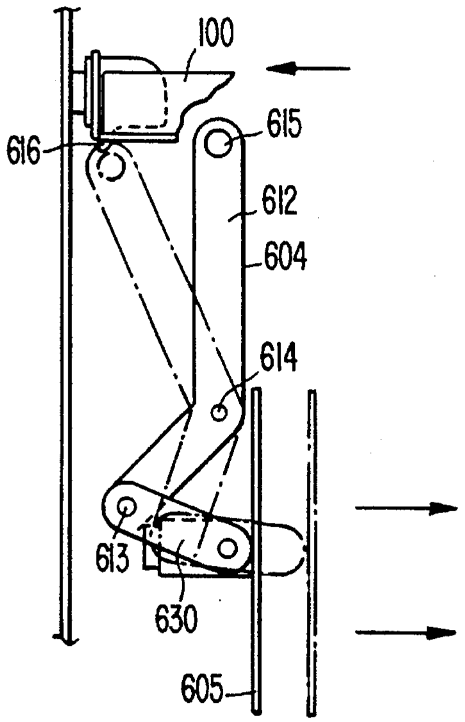
FIG. 19.
FIG. 20A.
FIG. 20B.
FIG. 20C.
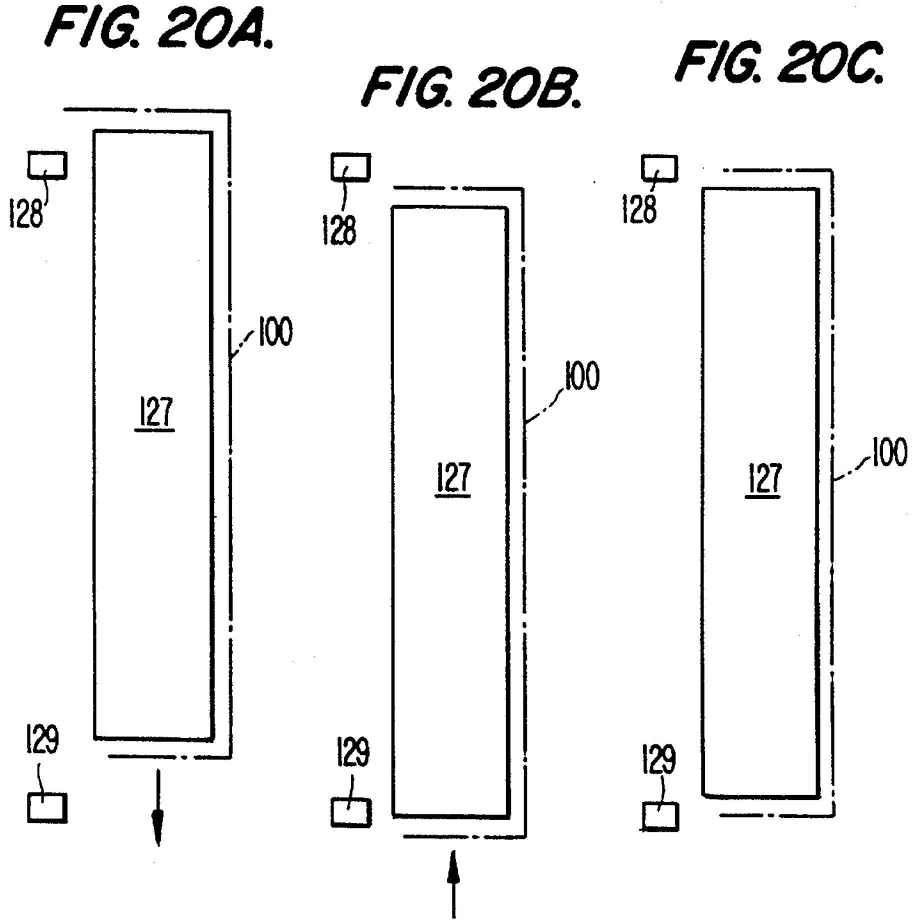

CARD EMBOSSING MACHINE AND METHOD

This application is a Continuation of application Ser. No. 08/167,070, filed Dec. 16, 1993 and now abandoned; which is a Continuation application of U.S. Ser. No. 07/534,481, filed Jun. 7, 1990 and now abandoned; which is a Divisional application of U.S. Ser. No. 318,961, filed Mar. 6, 1989; and now U.S. Pat. No. 4,969,760.

BACKGROUND OF THE INVENTION

The present invention relates to an improved embossing machine and method. More particularly, the invention pertains to an improved credit card embossing machine which is relatively lightweight, compact in construction, and quiet in operation due to the simplification of mechanisms used to power several operating assemblies in the machine. The method of the present invention provides an embossing operation which minimizes area, eliminates unnecessary mechanisms and improves operating characteristics of the machine.

Credit card embossing machines are well known. However, they all share one or more disadvantages which result in greater weight and/or space, complicated mechanisms which produce excessive noise, slow speeds, complicated processing, low responsiveness or high energy consumption. Some of these disadvantages also result in higher machine costs or in unnecessary maintenance of the embossing machine as a result of repeated operations using numerous mechanisms.

Efforts have been made on a continuing basis to increase the speed and reliability of these machines from the early fully mechanical devices of the types shown in U.S. Pat. Nos. 2,115,456; 2,463,690; and 2,973,853, while reducing their complexity and energy consumption. For example, U.S. Pat. No. 3,638,563 represents an effort to eliminate the cost and complexity of machines which had theretofore positioned a plurality of male and female embossing wheels simultaneously with their selected characters after which embossing dies were closed upon the plastic cards. This created positioning and alignment problems, the solution of which involved using a plurality of male character embossing punches whose actuation was computer controlled to move short strokes against corresponding female embossing character dies.

Conventional embossers also have not taken into account the saving of material. For instance, in a topper operation in which foil is caused by heat to be adhered to the raised embossed characters on a credit card, the topper foil was advanced in a fixed manner, regardless of the number of rows of characters to be topped. This resulted in unnecessary wasting of foil material when credit cards having a lesser number of rows or a smaller spacing between rows of characters were being processed on a continuous basis.

Although credit card blanks which are to be embossed usually have very tight tolerances, we have found nevertheless that there are some tolerance variations from card to card. However, conventional machines could not adequately and simply accommodate these tolerance variations in positioning these cards in the machine from a supply hopper to avoid the need for accurate adjustment of the moving parts so that the card could be accurately embossed in the desired areas. As a result, constant fine adjustment was required.

Most of the automated embossing machines known are particularly suited for high volume production of cards because they are relatively expensive and of substantial size. Consequently, they are not particularly useful for low volume producers due to the cost and size constraints. The high volume embossing machines employed linear arrays of embossing elements, with one embossing module being assigned a task of embossing characters on a single corresponding embossing line of a card. This arrangement while satisfactory for high speed production requires larger real estate for the machine.

SUMMARY OF THE INVENTION

It is an object of the present invention to produce an embossing machine which overcomes the problems and disadvantages encountered with conventional machines and, in particular, results in an embossing machine which is more compact and lighter in weight and which serves the needs of both low volume and high volume producers.

It is an object of the present invention to simplify the movement of the card on a carriage and to reduce the number of components for actuating certain mechanisms in the embosser by utilizing the movement of the carriage in transverse direction to effect actuation.

It is another object of the present invention to provide an effective embossing machine which utilizes only one interposer mechanism which is capable of increasing energy efficiency while lessening machine noise during the embossing operation.

It is yet a further object of the present invention to employ a toggle mechanism in the embosser assembly which obviates the needs for clutches and permits the use of a mechanically simple arrangement which is in timed relation with the rotation of the energizing motor.

It is still a further object of the present invention to minimize the number of positioning motors and simplify the transport of the card blank for processing.

These and further objects have been achieved in accordance with the present invention by the translation of the carriage carrying the card blank to be processed in an "X" direction or along an "X" axis from side to side of the machine and in a "Y" direction or axis from front to back of the machine. The carriage mechanism has been greatly simplified by effecting "Y" direction movement of the carriage on a guide bar so that the carriage mechanism can be made extremely light. As a result, motors for effecting the "X" and "Y" axis positioning can be both stationary and smaller and move the carriage in the "X" and "Y" directions more quickly and precisely.

The embossing machine in accordance with the present invention utilizes an extremely light yet precise positioning carriage mechanism which avoids the need for carrying a positioning motor and thereby avoids the undesirable extra mass normally associated with carriage mechanisms.

More specifically, the embossing machine in accordance with the present invention provides for movement from side to side from a card supply hopper to a magnetic coding operation to an embossing operation and then to a topper operation by means of an extremely small and lightweight carriage. Furthermore, the card is carried between the front and the back of the machine for clearing the carriage with the card thereon from the various assemblies and for actuating a clamping device and an ejection mechanism by movement of the carriage and a very lightweight guide bar upon which the carriage moves in the side to side direction. Furthermore, the entire carriage assembly which moves from side to side and front to back movement of the machine has a significantly reduced mass by virtue of the fact that the motors for moving the carriage assembly in both directions are stationary and are connected to the carriage assembly through a lightweight cable and pulley arrangement.

The embossing machine in accordance with the present invention substantially simplifies the embossing operation and reduces the size of the embossing machine to the greatest extent possible by supplying the cards to be embossed in a vertical direction to the carriage. Additional motors and mechanisms for operating, for example, a clamping device to clamp the blank card to the carriage are eliminated by the utilization of the carriage movement to effect clamp opening and closing as well as ejection of a defective card into a reject stack.

The present invention also comprises a considerably improved means for actuating the embosser through a single interposer mounted between toggle links of the embosser mechanism and a motor or by an interposer located between the male and female rams and their respective actuating levers.

Another aspect of the present invention is the incorporation of a topper assembly for applying topping or hot stamping foil to embossed characters on a card wherein a crank and ratchet mechanism avoids unnecessary take-up of foil used during the topper operation by taking up only that foil which was used in the last topping operation.

The new card supply hopper is arranged at one side of the machine so as to hold a stack of cards in the vertical direction, thereby reducing the horizontal real estate occupied by the machine. A card pushing mechanism is located at the bottom of the hopper and is actuated by movement of the carriage toward the new card supply hopper. An overload spring is arranged in the card pushing mechanism to compensate for minor tolerance differences as can occur from blank card to blank card. As a result, even if a card is slightly oversized, the spring will allow the card to be properly located in the clamping device without the need for fine adjustment of the mechanism. A projection is arranged at the front of the hopper and is designed to cooperate with the clamping mechanism on the carriage to close the clamping mechanism as the carriage approaches the hopper to pick up a card.

Embossing is carried out through an interposer mechanism arranged between the embosser motor and the embosser wheels or between the embosser rams and the embosser ram actuating levers. In the former arrangement, only a single interposer is needed to control the activation of the embossing mechanism. This arrangement allows the female die ram to be moved to a dwell position prior to the male die ram being moved to its final position to cause the embossing of the character on the card, and thus the sequence of moving the female die ram and the male die ram is controlled directly by the characteristics of the mechanical linkage and is not controlled directly by the activation of the interposer.

The toggle mechanism in the form of an upper and lower four bar linkage eliminates the need for clutches and can effectively utilize the rotational energy stored in a flywheel to power the short duration energy requirements needed for embossing and thereby lessen the overall size of the embossing motor.

Ejection of the cards after topping is effected by movement of the carriage carrying a newly embossed card to a position where that newly embossed card is positioned for eventual placement in the topping station. Consequently, the embossing machine of the present invention utilizes the movement of the carriage itself and eliminates the need for any separate mechanism for card ejection. In addition, the tying together of the ejection of topped cards with the movement of the carriage containing newly embossed card provides a more positive sequential control for the embossing machine.

The stacking of cards after completion of embossing and topping is accomplished in accordance with the present invention by the effective use of gravity to cause the cards to move down into a particular orientation without additional motors and complicated mechanisms. Cards stacking is accomplished in response to the carriage reaching the area of the topper assembly and pulling a topped card from the topper assembly by translation in the forward direction of the machine.

Moreover, for economy of operation and the elimination of other mechanisms, the embossing machine of the present invention provides a simple mechanism to allow defective cards to be ejected after completion of either the magnetic stripe encoding operation or the embossing operation by way of actuators on the machine operative upon "Y" axis translation of the carriage.

BRIEF DESCRIPTION OF THE DRAWINGS

These and further features, objects and advantages of the present invention will become more apparent from the following detailed description when taken in conjunction with the accompanying drawings which show presently preferred embodiments wherein:

FIG. 19 is a plan view of the card stacker mechanism shown schematically in FIG. 2;

FIGS. 20A–20C show the shutter mechanism on the carriage which demonstrates carriage movement to achieve the neutral zone in which carriage movement can take place only in one direction;

DETAILED DESCRIPTION OF PREFERRED EMBODIMENTS

Figure 1:
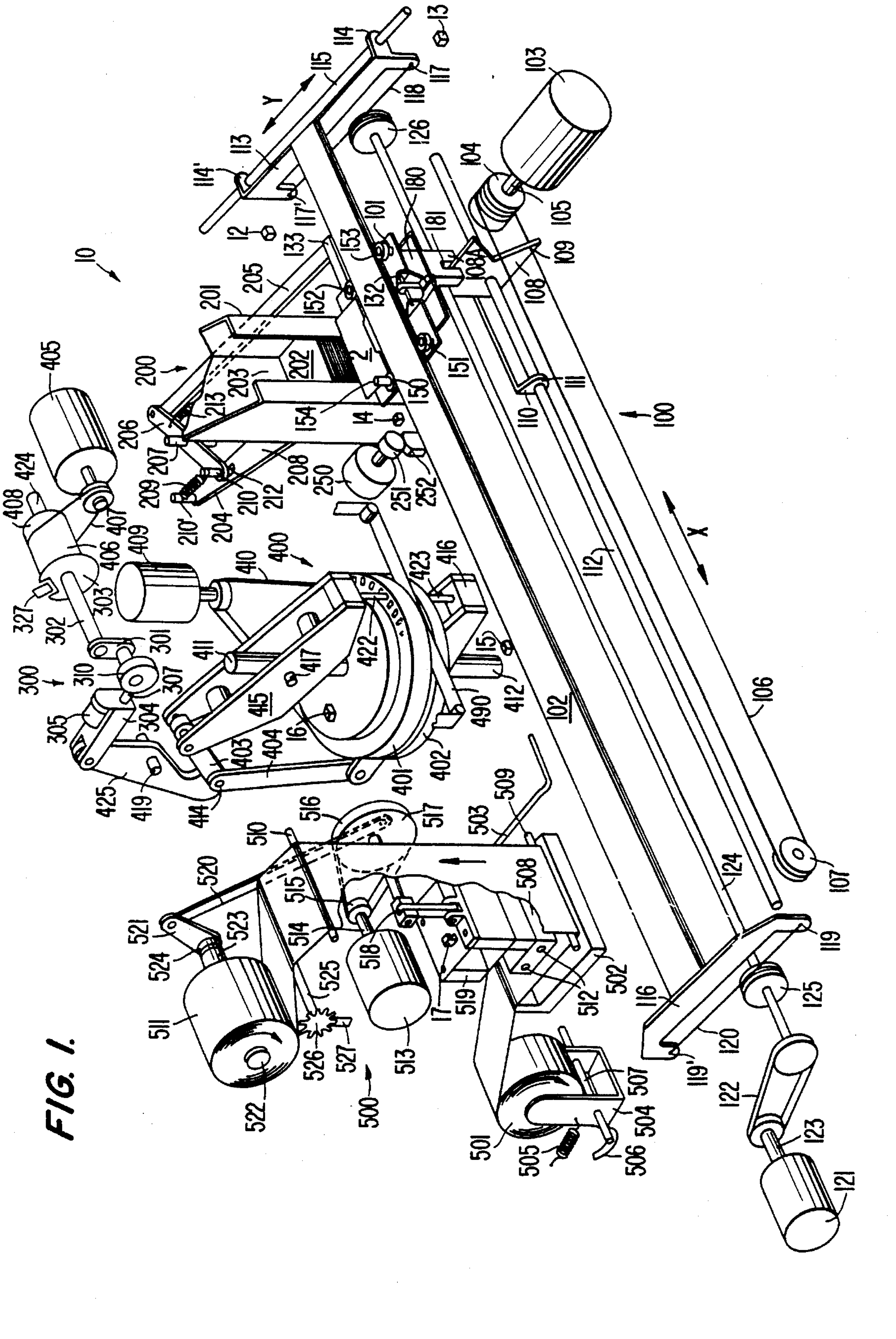
FIG. 1 is a schematic perspective view of a presently preferred embodiment of the compact embossing machine in accordance with the present invention with certain components, such as the stacker, reject mechanism and stacking channel, not shown for ease of illustration.
Figure 2:
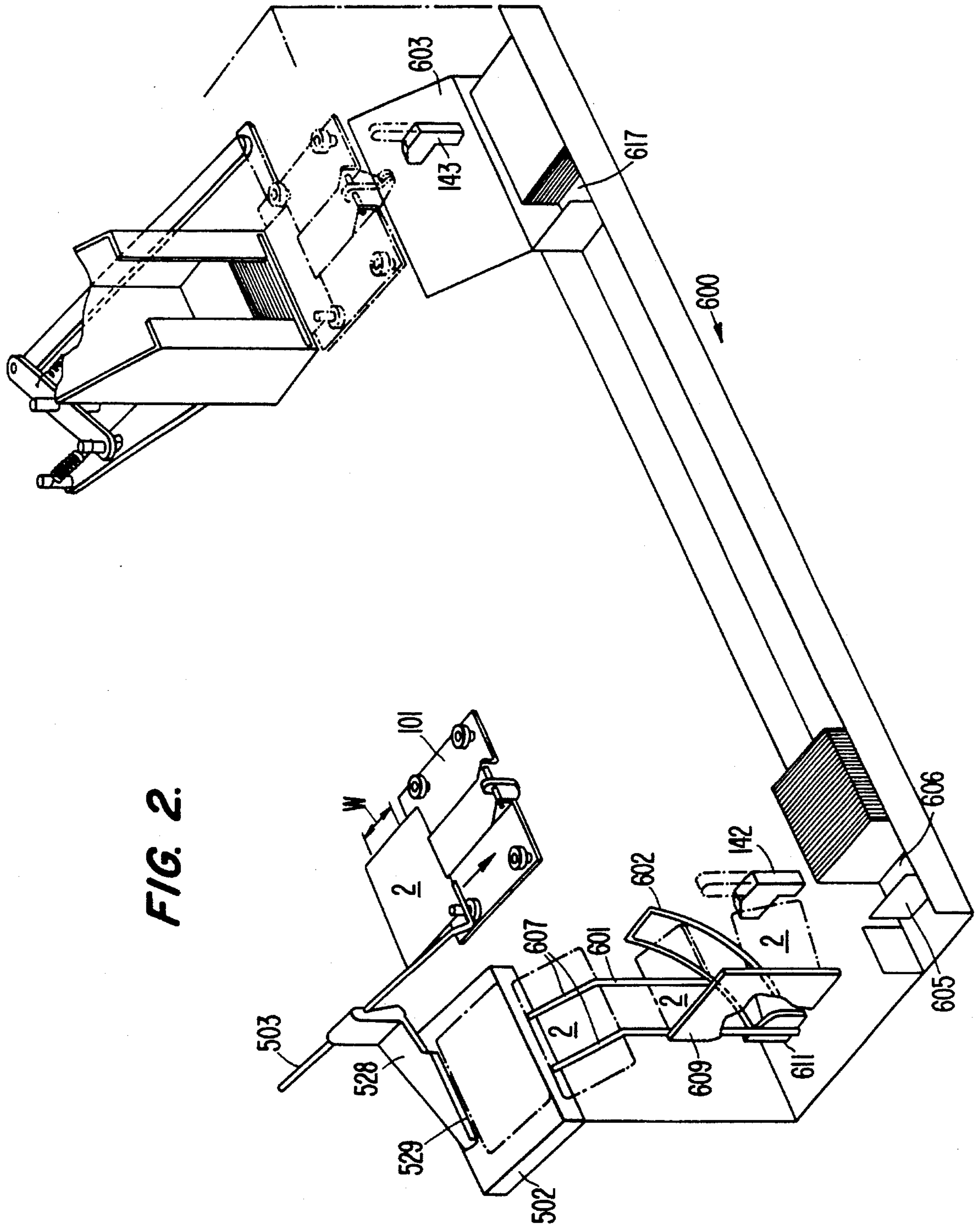
FIG. 2 is a schematic perspective view of the compact embossing machine of FIG. 1 but showing an ejector mechanism, a two-step card drop, and a horizontal stacker in accordance with one embodiment of the invention but omitting certain of the components such as the embosser shown in FIG. 1 again for sake of clarity.
Figure 3:
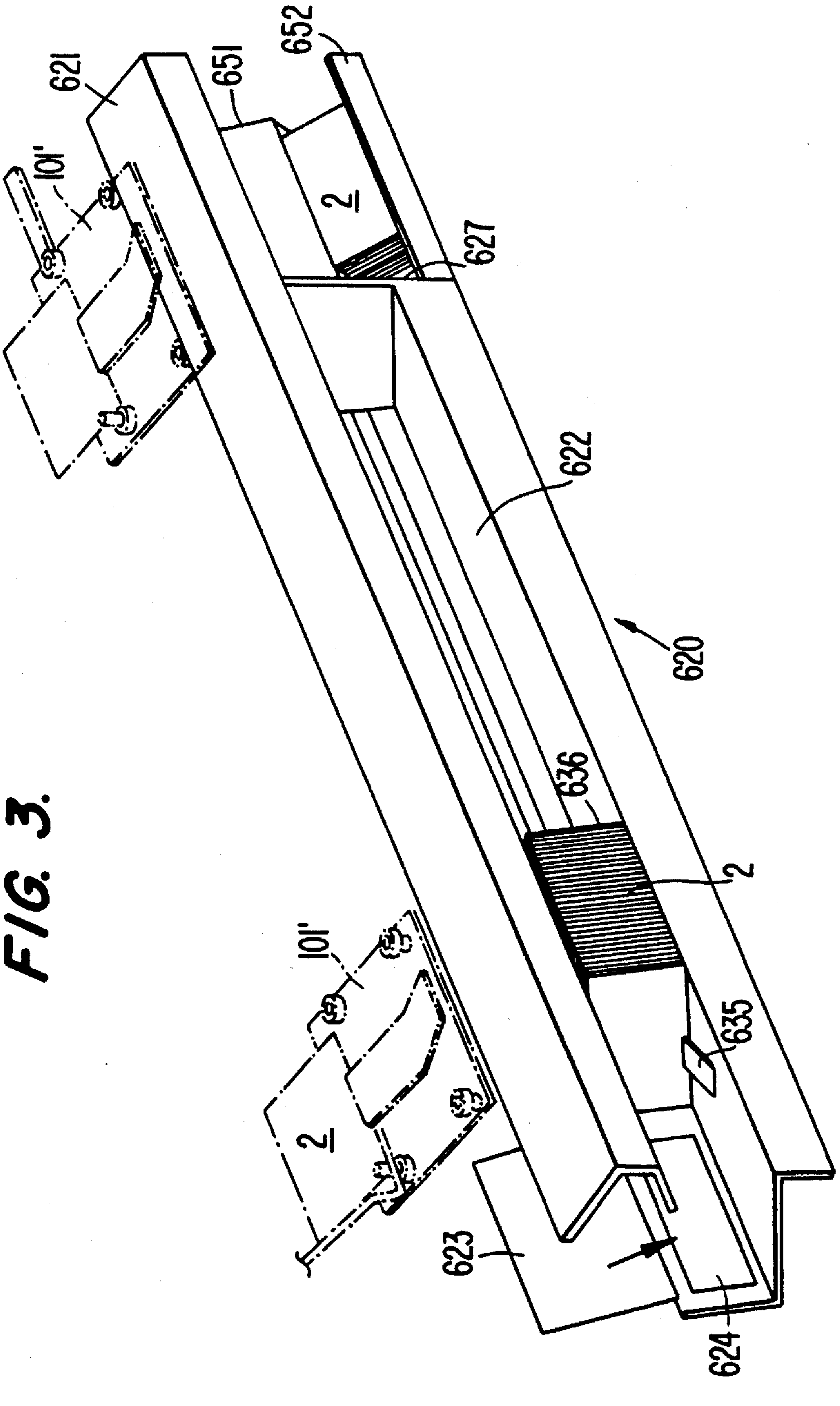
FIG. 3 is a schematic perspective view of the compact embossing machine of FIG. 1 but showing another embodiment with an angular stacker and a pivoted plate with certain of the components shown in FIG. 1 omitted for clarity and better understanding.

Referring now to the drawings and, in particular, to FIG. 1, the compact embossing machine in accordance with the present invention designated generally by the numeral 10 comprises a carriage assembly generally designated by the numeral 100, a new card feeding hopper assembly generally designated by the numeral 200, an interposer mechanism generally designated by the numeral 300, an embosser assembly generally designated by the numeral 400, a topper assembly generally designated by the numeral 500, and, as shown in FIG. 2, a horizontal stacker assembly generally designated by the numeral 600 or, as shown in FIG. 3, an angular stacker assembly generally designated by the numeral 620. The foregoing assemblies and parts are all carried by and connected to a frame 11 of the machine 10 in a well known manner which forms no part of the present invention except as hereinafter described.

Overall Operation of the Embosser Machine

The basic embossing operation carried out by the above-mentioned mechanisms and hereinafter described in greater detail is as follows with reference to FIGS. 1–3. A new blank card 2 from the bottom of a stack of vertically arranged cards 202 is fed into an opening at the bottom of a hopper 201 of the card hopper assembly 200 and is pushed partially out of the hopper 201 and onto a movable carriage 101 of the carriage assembly 100 on which it is clamped after the carriage 101 has either deposited an encoded and embossed card in the topper assembly 500 at the left side of the machine 10 or deposited a rejected card in the horizontal stacker channel 600 at the right side of the machine as shown in FIG. 2, and after the carriage 101 has moved into alignment with an opening (not shown) slightly larger than the thickness of the card 2 at the bottom of the hopper 201.

Figure 7:
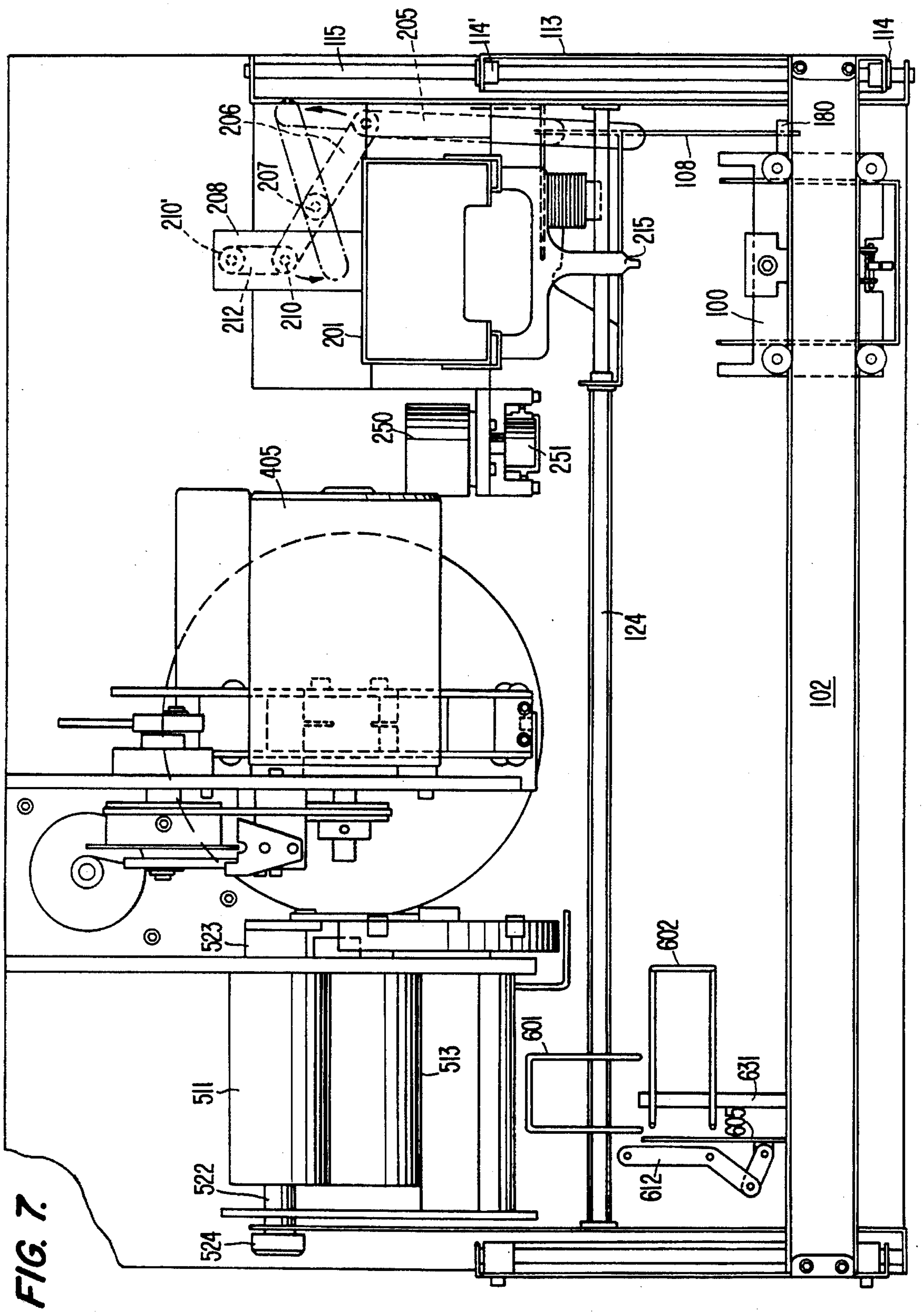
FIG. 7 is a top plan view of the machine shown in FIG. 6.

A clamping mechanism 132 on the carriage 101 is actuated to open at the left side of the machine 10 by a camming action of an actuator 142 when a good card is deposited in the topper assembly 500 or at the right side of the machine by an actuator 143 when a rejected card is dropped into the reject stack in the stacker channel assembly 600. In either case, the carriage 101 with the opened clamping mechanism 132 is then moved forward to the hopper 201 where a card picker mechanism 204 is actuated by the movement of carriage assembly 100 to push the blank card 2 partially from the bottom of the stack 202 in the hopper 201 where the carriage 101 is moved to engage the card and bring the opened clamping device 132 on the carriage 101 into a position where it can clamp and secure the card. The blank card 2 is clamped firmly on the carriage 101 by the closing of the clamping device 132 upon movement of the carriage 101 toward the hopper 201 by contact of the latch 189 (FIGS. 13–15) with projection 215 (FIG. 7).

The carriage 101 is then moved frontwardly for a short distance to pull the blank card 2 completely out of the hopper 201 and leftwardly on a T-shaped carriage bar 102 where it is first fed through a conventional encoding device 250 with a pulse counter 251 and juxtaposed with a spring loaded magnetic three track read/write head 252 to define a passage through which a magnetic stripe on the blank card 2 just selected from the hopper 201 is moved, and data is appropriately recorded on the stripe by the head 252. The stripe data is verified by moving the carriage 101 forward and returning the carriage 101 to the right of the magnetic head 252 and back to the original position where the blank card 2 is lined up with the head 252 and again carried through the passage defined by the counter 251 and the head 252 to verify that it has been properly encoded in a known manner. The wheel of the counter 251 frictionally engages with the surface of the blank card 2 with the urging of spring loaded head 252 so that the counter is frictionally driven and the correct positional information is sensed. This verification process can be repeated once more if the first process does not result in verification. If the blank card 2 has not been properly encoded, it receives no further processing and is returned to a location 617 (FIG. 2) or 627 (FIG. 3) at the right of the stacker channel assembly 600 or 620, respectively, with other rejected cards. If, however, the blank card 2 has been properly encoded, the card blank 2 is then moved leftwardly to the embosser assembly 400 where the card blank is embossed by rotating female and male wheels 401, 402 (FIG. 9) and actuating embosser rams 422, 423 cooperating with dies on the wheels in a generally known manner.

At the embosser assembly 400, an indenting operation on the card blank can also take place if desired. It is, of course, known by those skilled in this technology that embossing typically produces raised characters on an obverse side of the blank card 2 and a indenting operation produces small characters depressed below the surface usually on the reverse of the card. Consequently, an indenting ribbon 490 is usually provided at the embossing assembly 400 to give the indented data on the card a color which highlights or contrasts with the color(s) on the remainder of the blank card 2, thereby making that data more readily visible to someone inspecting the card in an effort to verify information.

If during the embossing and/or indenting operation the card is deemed defective, it is rejected and sent to the reject stack at the right of the horizontal stacker channel 600 (FIG. 2) or the angular stacker channel 620 (FIG. 3). Assuming the blank card 2 has been embossed and indented properly, it is again moved leftwardly on the carriage 101 to the topper assembly 500 where the previously topped card is removed by an ejector mechanism 503 pulled forward by the carriage 101 and caused to tumble into the stacker assembly 600 or 620. The carriage 101 is moved further to the left to be aligned with the topper platform 502 and then forwardly to open the clamping device 132 by means of the actuator 142. The now embossed card 2 is moved rearwardly by the carriage 101 and placed on the topper platform 502 in the topper assembly 500 under foil. A topper ram 519 presses the foil down upon the card and holds the card 2 firmly on the platform so that the carriage 101 can be moved forwardly and back to the new card supply hopper 201 and that the foil from a spool 501 can be topped by heat on the embossed characters of the blank card 2.

Thereafter, the now completely finished card is removed from the topper assembly 500 when the carriage 101 returns from the embosser assembly 400 with a newly embossed blank card to be topped, and the finished card is ejected from the platform 502 of the topper assembly 500 by the ejector 503 actuated by the forward movement of the carriage 101 whereby the card from the topper platform 502 is caused to tumble into the stacker assembly 600 or 620.

The Carriage Assembly

The carriage assembly 100 shown schematically in FIG. 1 includes the aforementioned carriage 101 which translates rightward and leftward or side-to-side along the guide bar 102 which is T-shaped and lightweight in what is considered the "X" direction indicated by the arrows in the foreground. To provide smooth translation in the "X" direction of the carriage 101 along the guide bar 102, the carriage is provided with rollers 150, 151 on one side of the carriage 101 and rollers 152, 153 on the other side of the carriage 101 in mating and sliding relationship with the guide bar 102 so as to entrain the guide bar between the four rollers Hexagonal studs 150', 151', 152', 153' are provided for the respective rollers 150, 151, 152, 153 to secure bushings and shafts about which the rollers rotate in a precise fashion.

Figure 13:
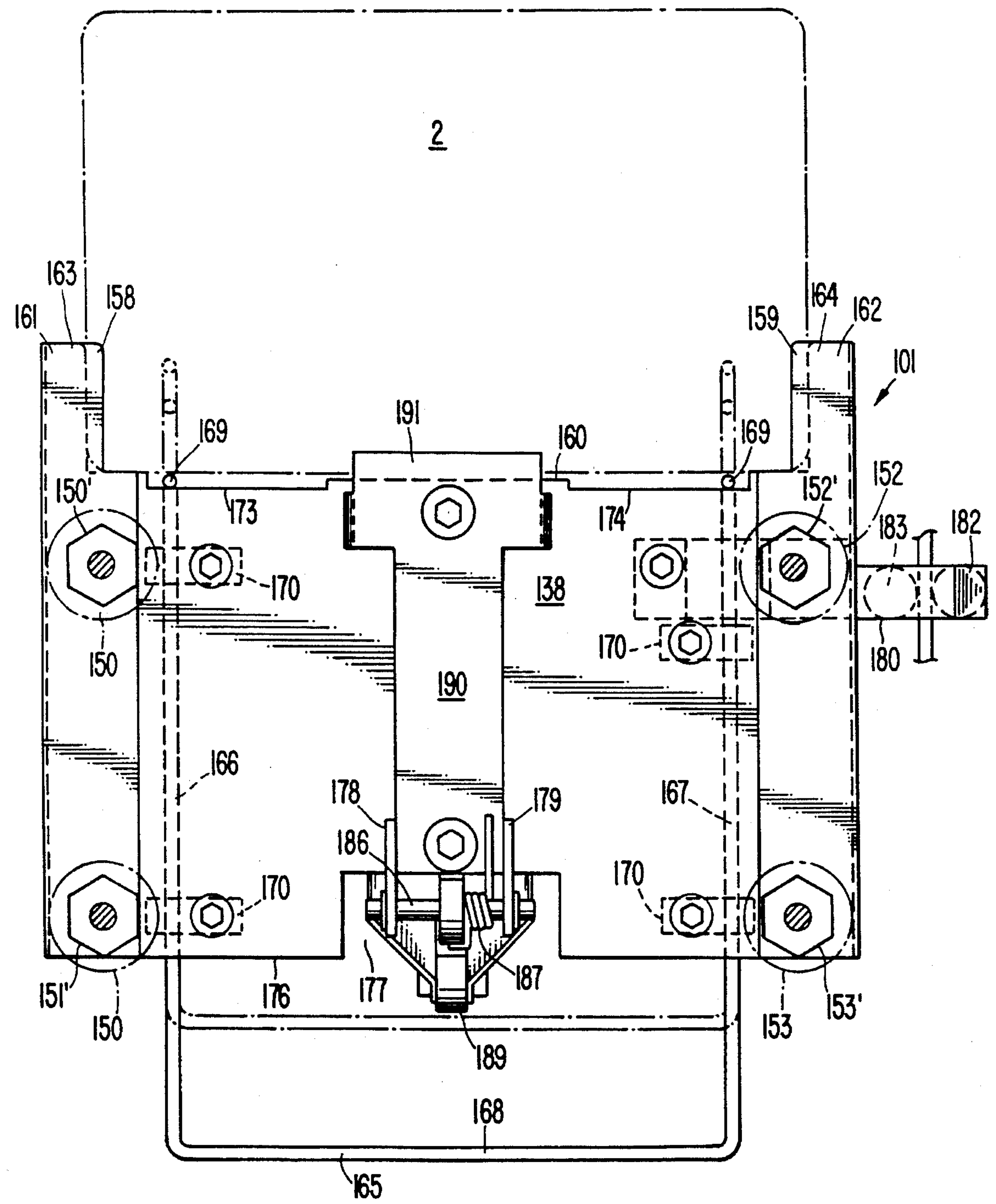
FIG. 13 is a top plan view of the carriage assembly shown schematically in FIG. 1.
Figure 14:
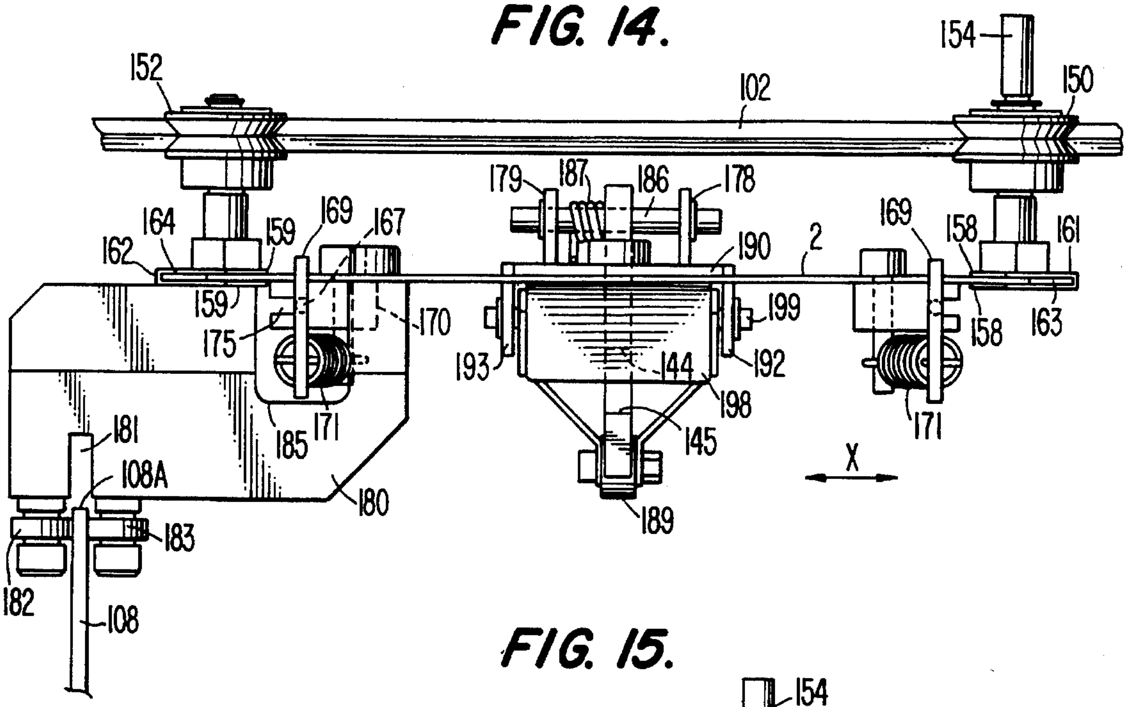
FIG. 14 is a side view of the carriage assembly shown in FIG. 13 as seen from the new card hopper assembly side.

The carriage 101 as shown in FIG. 13 has an end face 160 adapted to face and pick up the blank card 2 with card-engaging projections 161, 162 at each side of the carriage 101. The projections 161, 162 are U-shaped in cross section as shown in FIG. 14 with sufficient space between legs forming the U-shape to form shelves 158, 159, at the top and bottom surfaces of the respective projections 161, 162 for receiving the blank card 2 securely in the space defined between the upper and lower shelves of each projection as the carriage 101 approaches the blank card 2 which has been partially fed from the new card supply hopper 201 and as the carriage 101 moves into proximity to the hopper 201. Projections 163, 164 from the body 138 forming the base of the carriage 101 are provided in the U-shaped projections 161, 162 to provide the proper spacing for the card blank 2 so that card blanks with tolerance variations can be received easily between the two projections 161, 162 but also without undue play. The corners of the projections 161, 162 and the respective projections 163, 164 in proximity to the card blank 2 are shown rounded to assure smooth entry of the card blank 2 into the carriage 101 without any damage to the card or long term wear of the carriage 101. Alternatively, the edges could be flared outwardly slightly to prevent any interference between the projections and the card.

Figure 16:
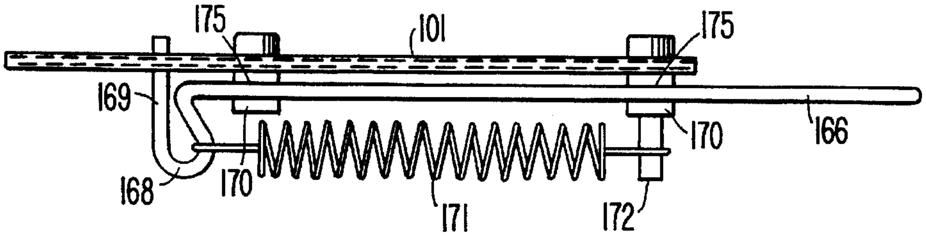
FIG. 16 is a detail view of the spring mechanism associated with the carriage shown in FIGS. 13–15 for ejecting a card held on the carriage.

A stiff U-shaped wire member 165 has legs 166, 167 joined by a bight portion 168. Each end of the legs 166, 167 is provided with a hooked portion 168 in the form of a loop as shown in FIG. 16 so that an upstanding portion 169 is formed on each leg on the end 160 of the carriage assembly 101. The wire member 165 is retained underneath the carriage 101 in a freely slidable but secure manner by brackets 170 joined to the body 138 of the carriage assembly 101 by conventional brackets and having a U-shaped channel 175 at the end for receiving the legs 166, 167. The two upstanding portions 169 are caused normally to be biased against the side 160 of the carriage 101 by springs 171 (only one of which is shown in FIG. 16) connected between the looped hooked portions 168 and a downwardly projecting piece 172 depending from the brackets 170 adjacent the rollers 151, 153.

The end face 160 of the carriage assembly 101 has two recessed portions 173, 174 into which the upstanding portions 169 are biased by the springs 171 so that a card blank 2 can seat firmly between the projections 161, 162 in the L-shaped portions defined by the spacers 163, 164 and against the end face 160 of the carriage assembly 101 as shown by phantom lines in FIG. 13. The wire member 165 is slidable from its forward position shown in solid lines in FIG. 13 to the rearward position shown in dotted lines when a rejected card moved to the right in the "X" direction and the clamping device 132 is cam actuated by the latch actuator 143 (FIG. 2) by forward movement of the carriage 101 in the "Y" direction. Upon further forward movement of the carriage, the bight portion 168 hits an upstanding projection on the actuator 143 (shown in dotted lines in FIG. 2) whereupon the blank card 2 is pushed from the carriage 101 by the upstanding portions 169 as a result of relative motion between the wire member 165 and the carriage 101 against the bias of springs 171. The upstanding portions 169 push the card from between the projections 161, 162 after the clamping device 132 has been released so that the rejected card is allowed to fall into the reject stack.

It should be noted that the latch actuator 142 located at the topper assembly 500 can also include an upstanding projection (shown in dotted line) so that if a topper 500 is not used the card can be dropped into the stack at the left of the machine 10 by moving the carriage 101 forward in the "Y" direction to permit the wire 165 to push against the upstanding projection and push the card out of the carriage projections 161, 162.

Figure 15:
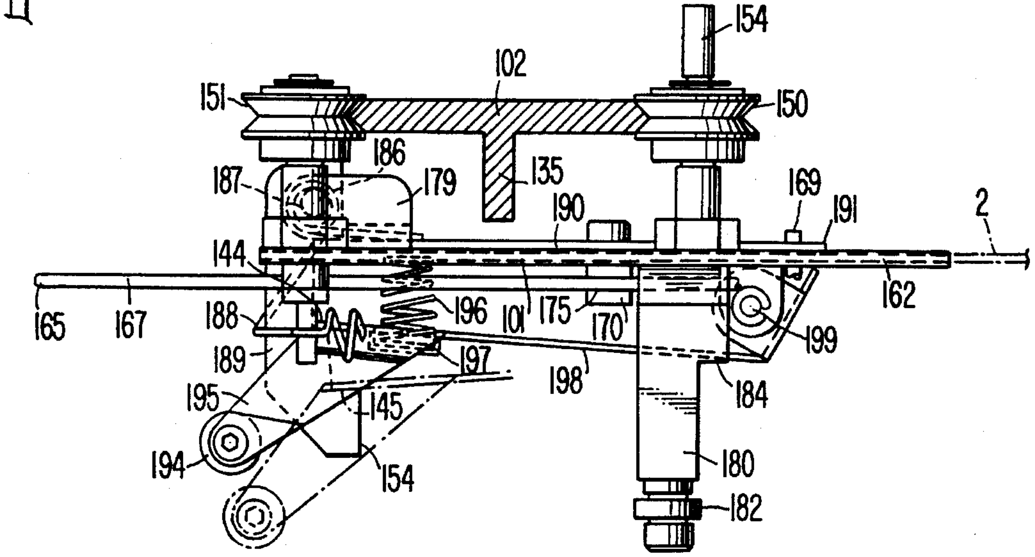
FIG. 15 is an opposite side view of the carriage assembly shown in FIGS. 13 and 14.

The clamping device 132 is shown in greater detail in FIGS. 13–15 and consists of a fixed jaw 190 and a movable jaw 198 which are normally biased together by a compression spring 196 causing a counterclockwise rotation around a pivot shaft 199 rotatably connecting the fixed jaw 190 and the movable jaws 198. Upwardly projecting tabs 178, 179 are provided at the upper surface of the carriage body 138 and extend forward into a recess 177 provided at the central portion at the front end 176 of the carriage 101. A shaft 186 extends between the flanges 178, 179 and carries a torsion spring 187 which has one leg 188 in biasing engagement with a downwardly projecting latch 189 upon which the movable jaw 198 rides.

The fixed clamping jaw 190 is provided on the top surface of the carriage 101 between the two flanges 178, 179. The fixed jaw 190 extends rearwardly from the recessed portion 177 at the front of the carriage 101 to the rear side 160 where the jaw 190 has a portion 191 which extends beyond the side 160 so as to be able to engage a blank card 2 and firmly hold it in cooperation with the movable jaw 198 after the card has been pushed partially from the hopper 201 by the rearward movement of the carriage 101 in the "Y" direction. The jaw 190 is provided with two downwardly projecting members 192, 193 between which the pivot shaft 199 is held.

A roller 194 is rotatably mounted between the ends of a V-shaped (as seen from the front of the machine) bracket 195 mounted at the rear of the movable jaw 198. The latch 189 has two stepped portions 144, 145 upon which the rear end of the movable jaw 198 is intended to rest, against the urging of both the torsion spring 187 and the compression spring 196 between the carriage body 138 and a well 197 in the movable jaw 198, in the open and closed positions, respectively. The clamping device 132 is a bi-stable clamp which moves between the open line position shown in solid line to the closed position shown in dotted line in FIG. 15. The latch 189 has a vertical abutting surface 154 which is positioned to be pushed clockwise about the shaft 186 upon movement of the carriage 101 towards the hopper 201 causing the projection 215 in FIG. 7 to contact the latch 189 which rotates the latch clockwise against the force of the torsion spring 187 to cause a card 2 to be clamped under force applied by compression spring 196.

Figure 6:
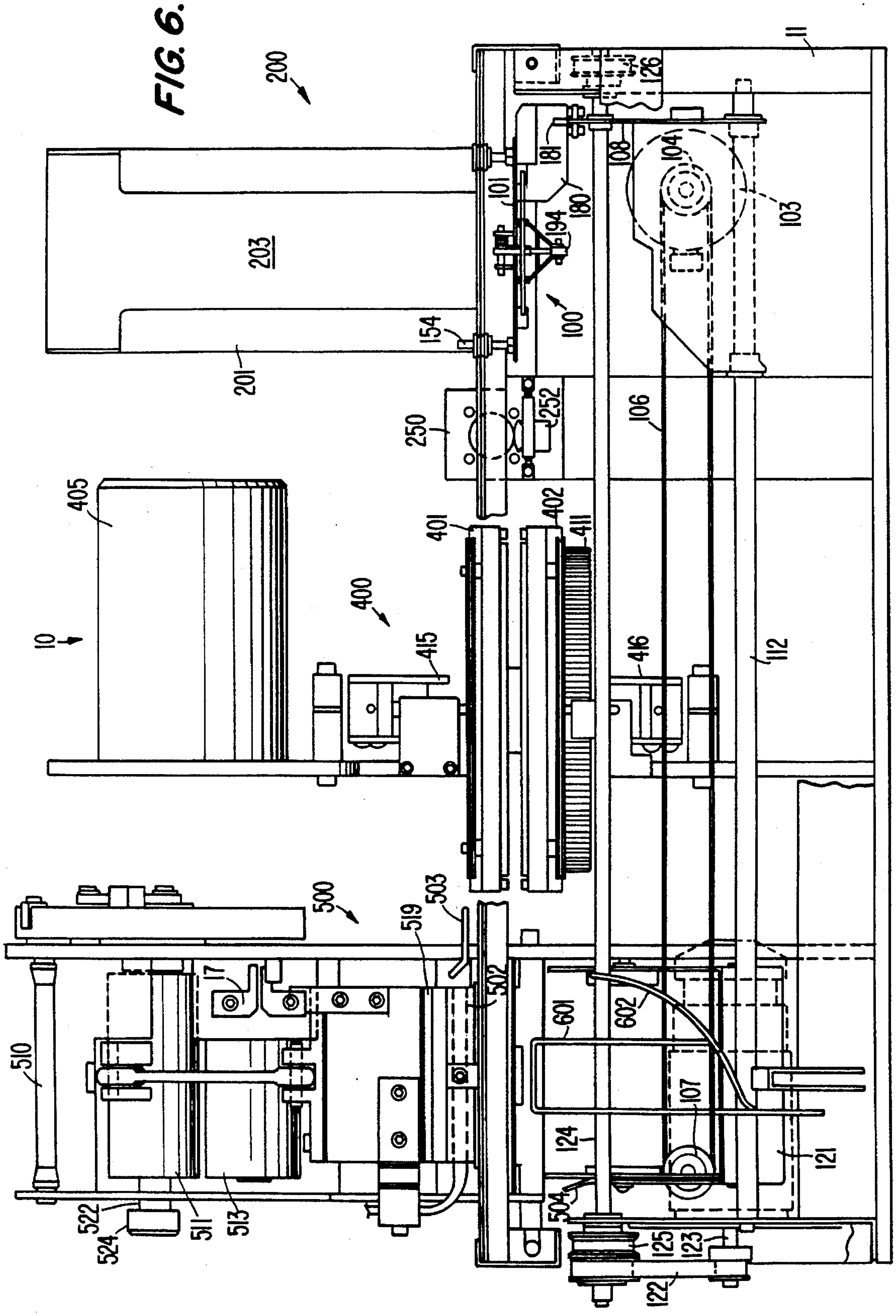
FIG. 6 is a more detailed front view of the embossing machine showing the carriage mechanism, embosser assembly and card hopper drawn schematically in FIG. 1.
Figure 8:
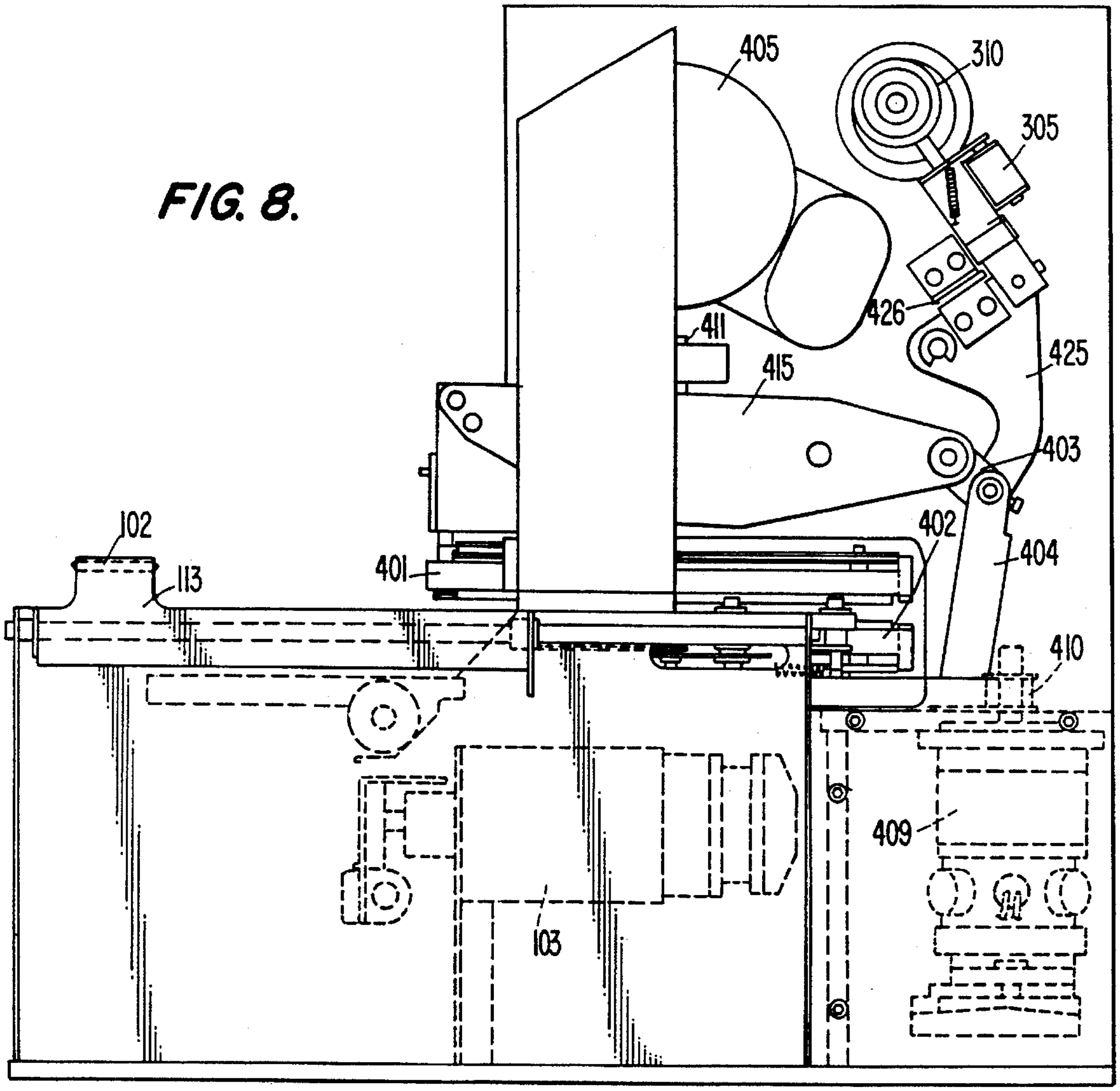
FIG. 8 is an elevational view on the new card hopper supply side of the machine shown in FIGS. 6 and 7.

In the embodiment shown in FIGS. 6–8, which is the embodiment schematically shown in FIG. 1, the carriage 101 traverses the guide bar 102 for a distance of about 14 inches by means of a reversible D.C. positioning motor 103 with an encoder provided for motor positioning control in a known manner and a cable drum 104 mounted on a rotating shaft 105 of the motor 103. A cable 106 which is clamped to and then wound about the cable drum 104 by about five turns for positive engagement therebetween forms an endless loop around the pulley 107 for providing precise positioning of the carriage 101 by means of the motor 103. A blade 108 attached to the carriage 101 by a sliding connection 108A is formed with a portion 109 to which the cable 106 is fixed. Upon actuation of the motor 103 in the counterclockwise direction, the carriage 101 will be moved to the left toward the topper assembly 500. Likewise, upon actuation of the motor 103 in the clockwise direction, the carriage 101 will be moved to the right toward the hopper assembly 200.

To maintain accurate positioning of the carriage 101, a slide 110 is fixed to the blade 108. The end 111 of the slide 110 is provided with an aperture 140 (FIGS. 6 and 7) through which a stationary guide 112 passes with minimum friction but also with minimum play. Similarly, an aperture 141 (FIGS. 6 and 7) axially aligned with the aperture in the end 111 of the slide 110 is provided in the blade 108 itself so that the carriage 101 can be stably supported and move precisely along the guide bar 102 upon actuation of the "X" direction motor 103 in the clockwise or counterclockwise direction.

The carriage 101 is provided with a downwardly projecting lug 180 with an opening 181 which rides along the blade 108 at side 108A so that there is always a communication between the carriage 101 and the blade 108 as the carriage 101 moves in the "X" and "Y" directions, thereby carrying the carriage 101 along in the "X" direction regardless of where the carriage assembly 101 is in the "Y" direction. The lug 180 also serves as the protrusion to actuate upon movement of the carriage assembly 100 the push card mechanism 204 which in FIG. 1 is actuated by the protrusion separately shown and designated with numeral 133.

In the embodiment of the carriage 101 as shown in FIGS. 13–15, the lug 180 rides along the blade 108 by means of rollers 182, 183 rotatably mounted at the bottom of the lug 180 so as to engage the blade 108 for smooth sliding therealong throughout the entire movement of the carriage 101 in the "Y" direction (i.e. into the plane of the paper showing FIG. 14) while the carriage 101 can be moved in the "X" direction shown by the arrows in FIG. 14. The lug 180 is undercut at the location designated by numeral 184 so as to permit the carriage 101 to move further along the blade 108 toward the hopper 201 without interference for the length of the undercut portion. In addition, the lug 180 is provided with a U-shaped channel 185 to permit movement of the carriage 101 relative to the biased wire member 165. Also, the carriage bar 102 is T-shaped with a flat horizontal portion 134 and a vertical member 135 (FIG. 15) to provide rigidity for precise movement of the carriage 101 while allowing the bar to be made of lightweight material and smaller dimensions.

To permit movement of the carriage 101 in the "Y" direction which is transverse to the "X" direction as shown by the arrows in FIG. 1, one end of the guide bar 102 is provided with a slide 113. Each end of the slide 113 is provided with an apertured lug 114, 114' through which a stationary guide bar 115 passes in the "Y" direction transverse to the "X" direction. A blade 116 is provided at the other end of the guide bar 102. The blade 116 is provided with apertured lugs 136, 136' at each end through which passes a stationary guide bar 137 fixed to the machine frame 11. Two dependent lugs 117, 117' are provided at each end of the slide 113 between which a cable 118 is tautly strung so as to clamp to and then wind around a pulley 26 for positive engagement and precise positioning. Likewise, dependent lugs 119, 119' are provided at each end of the blade 116 between which a cable 120 is tautly strung for driving engagement. To maintain precise positioning of the carriage 101, guide rods 115, 137 can be mounted to the frame 11 so that respective blades 116, 113 can ride therealong in a sliding but play-free relationship. It will be appreciated that mechanisms other than a pulley and cable might be utilized to obtain "X" and "Y" direction movement without departing from the scope of the invention, although the disclosed mechanism is extremely light and advantageously simple in construction particularly since the carriage movers are stationary and thus do not add unnecessary mass to the carriage assembly 100.

A reversible D.C. positioning motor 121 with an encoder for precise motor positioning is provided adjacent the blade 116 for selectively moving the carriage 101 back and forth in the "Y" direction. A belt-and-pulley arrangement 122 is provided between an output shaft 123 of the motor 121 and a stationary "Y" shaft 124 which extends between the slide 113 and the blade 116. The shaft 124 is mounted in the frame 11 and also passes through the aperture 141 in the blade 108, thus acting to prevent rotation of the slide 110 for promoting more precise movement and location of the carriage 101 in the "Y" direction.

A pulley 125 is axially fixed on the stationary "Y"-shaft 124 in juxtaposition to the cable 120 carried by the blade 116 with the cable 120 clamped to and then wound around the pulley 125 with one or two turns to obtain positive engagement between the pulley and cable for precise positioning by the associated motor. The pulley 126 is axially fixed on the "Y"-shaft 124 in juxtaposition to the cable 118 which is clamped to and then wound therearound to assure positive engagement. Upon clockwise actuation of the "Y"-direction motor 121 as viewed in the direction looking from the motor 121 toward the carriage 101 in FIG. 1, the guide bar 102 along with the carriage 101 are moved toward the front of the embossing machine 10 in the "Y" direction with the carriage 101 sliding along the blade 108 but maintaining engagement therewith at all times throughout "Y" direction travel until the carriage 101 reaches the position shown in FIG. 7. Upon counterclockwise actuation of the motor 121, the carriage 101 along with the guide bar 102 are moved toward the back of the machine 10 until the carriage 101 is adjacent the new card feeding hopper assembly 200.

"Y" direction motion of the carriage 101 is monitored by a shutter 127 mounted in an appropriate location at the end of the carriage assembly 101, e.g. on the slide 113, and two spaced photo sensors 128, 129 located on the machine frame 11 (FIGS. 20A–20C) to cooperate with the shutter 127. With the exception of one position called the "X"-direction traverse position shown in FIG. 20C, the shutter 127 will uncover either photo sensor 128 or photo sensor 129 but not both during travel in the "Y" direction. However, in the "X"-direction traverse position shown in FIG. 20C where the neutral zone has been reached, both photosensors 128, 129 are uncovered such that the carriage 101 can traverse the guide bar 102 along the full X-direction.

In the start-up mode when the carriage movement is initialized, the "X" axis traverse position is attained by moving the carriage assembly 100, and thus also the shutter 127, until the neutral zone shown in FIG. 20C is reached. The carriage 101 is then moved along the guide bar 102 in the "X"- direction to the right until it abuts against an adjustable hard stop (not shown). Upon contact with the stop, the carriage 101 is backed off a predetermined number of steps to the left. By way of illustration, one step can be 0.0143 inch. The "home" position has now been achieved. Each time the machine is initialized after a power interruption, it will be necessary to carry out the above steps to achieve the home position. The machine remembers its home position so that the carriage 101 can now be moved forward to the supply hopper 201 and trips closed the above-described card clamping device 132 by virtue of the latch 189 being moved clockwise around shaft 186 by contact with the projection 215 mounted at the front of hopper 201.

During continuous running of the embossing machine thereafter, it will not be necessary to achieve the home position of the carriage 101 after each cycle because the machine has memory and associated circuitry of well known type which stores the home position and continually stores the current position of the carriage 101 relative to the home position. Thus, ejection of a processed card or of a rejected card will effectively initialize the machine with the exception that ejection of a good card will have cocked open the clamping device 132 on the left side of the embossing machine 10 via the latch actuator 142 camming the roller 194 to push the movable clamp jaw 198 clockwise and allow the latch 189 to slide down to the stepped position 145 from the stepped position 144, and the ejection of a rejected card will have cocked open the clamping device 132 on the right side of the machine 10 via the latch actuator 43 camming the roller 194 and pushing the movable jaw 198 clockwise as previously mentioned.

Another embodiment of a carriage and mechanism for actuating the carriage clamp is shown in FIGS. 24–27. The carriage 101' has two card receiving projections 161', 162', which are constructed similar to the projections 161, 162 shown in FIGS. 13–15 for receiving a card, between which a card (shown in dotted lines in FIG. 24) is held. The carriage has a clamping device 132' having a fixed jaw 190' on its bottom surface and a movable jaw 198' on its top surface. The fixed jaw 190' is a plate which extends slightly beyond the rear edge 160' of the carriage to cooperate with a portion of the movable jaw 198' which also extends beyond the rear edge 160' to clamp the card therebetween. An ejector 146' in the form of a thin plate is mounted at the top of the carriage 101' for sliding movement on shoulder bushings 147', 148', 149'. A slot 150' is provided in the ejector 146' to permit selective forward and backward motion when ejecting a card into a topper assembly 500 or directly into a stacker channel 600 when no topper operation is performed or into a reject stack if the card is defective.

A lever 151' having an L-shaped projection 152' with a camming surface 153' is rotatably mounted on the machine frame 11, e.g. at a stacker channel cover 621, about a pivot 154' also fixed on the frame 11. The lever 151' is biased in the clockwise direction as viewed in FIG. 24 by a light spring 155' so that an abutment surface 156' on a face of the projection 152' normally abuts against a stationary stop 157' formed on the frame which in this case is a piece of sheet metal bent downwardly.

A torsion spring 196' is mounted on a shaft 197' on which the lever 198' is also mounted for pivotal movement between two upstanding flanges 178', 179' and is normally biases the lever 198' into a closed position. The free end 199' of the lever 198' is bent slightly upwardly so as to form a surface which cooperates with the camming surface 153'. Likewise, the front end of the ejector 146' is provided with two slightly bent-up tabs 110', 111' for operation as hereinafter described.

Figure 24:
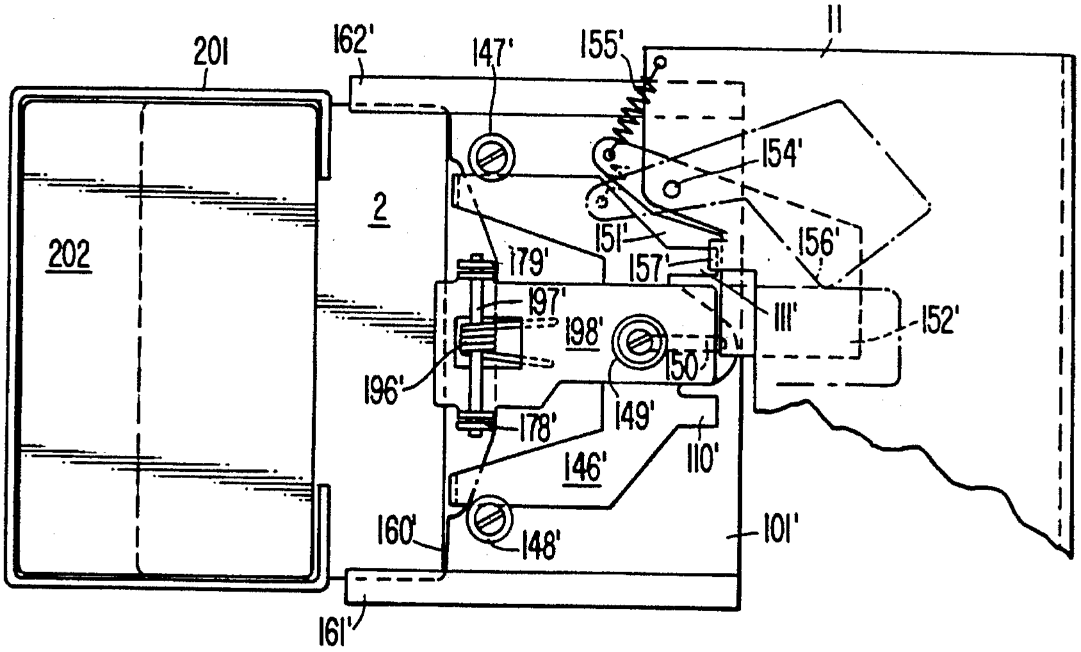
FIG. 24 is a top plan view of another embodiment of a carriage and clamping mechanism.
Figure 25:
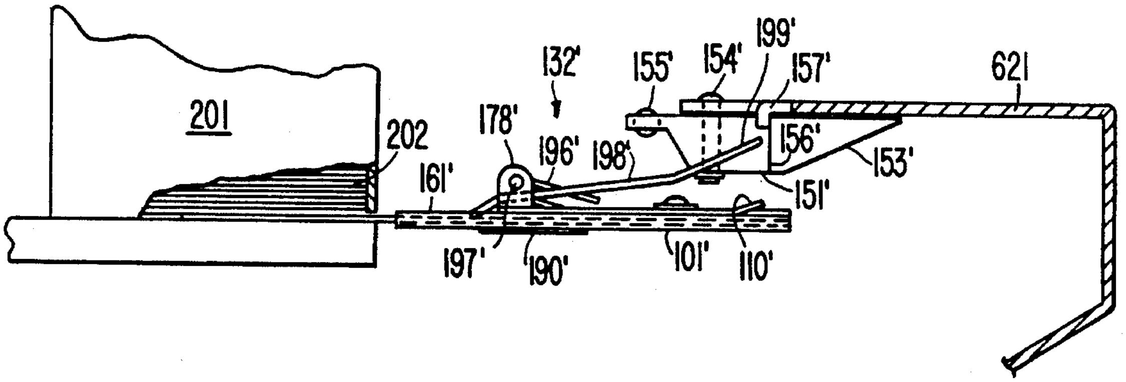
FIG. 25 is a side view of the carriage and clamping mechanism of FIG. 24.

In the state shown in FIGS. 24 and 25, the carriage 101' has already advanced toward the new card supply hopper 201 and received a card between the open jaws 190', 198' which are now closed on the card The carriage 101' is now moved forward in the "Y" direction toward the stacker channel, and the free end 199' of the lever 198' pushes against the abutment surface 156' and moves the lever 151' counterclockwise to the position shown by phantom lines in FIG. 24 wherein the movable jaw 198' has been cleared for further forward movement in the "Y" direction and then movement in the "X" direction for encoding, embossing/indenting and topping.

The New Card Hopper Assembly And Magnetic Stripe Encoder

A new card feeding hopper assembly 200 is arranged at the right side of the machine in proximity to the home position of the carriage 101. The assembly 200 includes a generally rectangular hopper 201 containing a stack of blank cards 202 orientated in the vertical direction. A vertical opening 203 is provided at the front of the hopper 201 to show the stacked card therein. Another opening (not shown) is provided at the bottom of the hopper 201 where the projecting member 215 is located with a thickness sufficient to permit only a single blank card 2 from the stack 202 to be pushed from the hopper 201 onto the carriage 101 where the blank card 2 is secured by the previously described clamping device 132 upon contact between the latch surface 154 and the projection 215.

A push link mechanism generally designed by the numeral 204 is operatively associated with the bottom of the hopper 201. The push link mechanism 204 includes a push link 205 which is normally biased by a spring to the position shown in solid lines in FIG. 7. Upon the movement of the carriage 101 to the pick-up position, in particular movement of the carriage 101 in the "Y" direction toward the hopper 201, the projection 133 in FIG. 1 or the lug 180 in FIG. 13 contacts one end of the link 205 and pushes the latter rearwardly, to the position shown in dotted lines in FIG. 7. The other end of the push link 205 is pivotally connected with one end of a lever 206 which is fulcrumed around a pivot 207 fixed relative to the machine frame 11. The other end of the lever is joined to a card pusher or picker 208 in the form of a plate which translates in the "Y" direction by virtue of the push link 205 being pushed back against a spring bias to rotate the lever 206 counterclockwise. An elongated slot 212 in the pusher 208 has a pin 210 from the card pusher 208 extending therethrough so that the card pusher 208 can translate rectilinearly in the "Y" direction a sufficient distance (e.g. halfway into the hopper 201) and the lever 210 can rotate about the fulcrum 207 without interference.

As mentioned above, the separately shown protrusion 133 shown schematically in FIG. 1 can be in the embodiment of FIGS. 7 and 13 actually incorporated in the lug 180 which slides along the blade 108. The protrusion 133 can be-made of plastic or other material. A spring 209 is connected between the pin 210 and pin 210' to prevent overloading of the mechanism 204. Stated somewhat differently, the overload spring 209 is provided to compensate for minor tolerance differences as can occur from blank card to blank card. For instance, if a card blank is slightly oversized, the yielding of the spring 209 will locate the blank in the clamping device 132 without the need for adjustments. Likewise, if the blank is slightly undersized, the card pusher 208 can be pushed against the bias of spring 209 to force the card pusher 208 the desired distance into the hopper 201.

When the carriage 101 returns empty to the pick-up position at the hopper 201 by movement first in the "X" direction to the right and then in the "Y" direction to the rear, the lug 180 (or protrusion 133 in FIG. 1) on the carriage 101 pushes the mechanism 204 and causes a single card to be removed from the bottom of the vertical stack 202 in the hopper 201 and to be clamped by the clamping device 132 on the carriage 101 which has been cocked open by the roller 194 camming on the latch actuator 142 or 143 and thereafter closed by the compression spring 196 when moved forward in the "Y" direction and the latch surface 154 hits the projection 215. The clamping device 132 will again be cocked open, as previously described, at the left side of the machine 10 before it deposits the previous blank card on the topper platform 502 or will be cocked open at the right side of the machine when discarding a reject.

A magnetic stripe encoder 250 is located to the left of the hopper 201. The encoder 250 is of conventional construction and includes revolving pulse counter 251 arranged frictionally to engage the surface of the blank card by virtue of an opposing spring loaded three track magnetic read/write head which writes data on the magnetic stripe of a card in a known manner. The head 252 also verifies that the data has been correctly written on the stripe. The circuitry for effecting writing and verification is also well known and not shown for sake of clarity. If the stripe data is deficient or defective, the card will be rejected before the embossing, indenting and topping operations take place shown in the flow diagram of FIG. 5, and the carriage will be returned to the right side of the machine to cock open the clamping mechanism 132 and pick up a new card blank 2 from the stack 202 in the hopper 201.

More specifically, after the carriage 101 has picked up a new card blank 2 at the hopper 201, the carriage 101 moves slightly forward in the "Y" direction so that the carriage 101 will have a clear path through the passage defined between the counter 251 and the head 252. The stripe of the blank card 2 is moved in the "X" direction by movement of the carriage 101 along the carriage bar 102. The stripe is written by the head 252 as the surface of the moving card turns the counter 251 through frictional engagement so that an accurate location of when writing begins and ends is recorded. Thereafter, "X" direction movement ends, and forward movement in the "Y" direction commences to clear the head 252. Then, "X" direction movement to the right begins until the carriage 101 is to the right of the head 252 at which time the carriage 101 is moved rearwardly in the "Y" direction and then back in the "X" direction through the passage between the pulse counter 251 and head 252. If the data on the stripe cannot be verified, the card will either be rejected by moving it forward in the "Y" direction and to the right in the "X" direction where it is ejected into the reject stack. Alternatively, the card can again be cycled through the passage for a second attempt at verification, failing which the card is moved to the reject stack.

The Interposer And Embosser Assemblies

One embodiment of the interposer 300 and embosser assembly 400 are shown schematically in FIG. 1. The interposer 300 is provided so that energy sufficient to actuate and deactuate the rams 422, 423 associated with the female and male embosser wheels 401, 402, respectively, through the toggle linkage 403, 404 can be achieved very rapidly with sufficient force (e.g. 300 lbs.) to provide acceptably embossed characters in the minimum amount of time without creating excessive noise or requiring an oversize embossing motor.

An embossing motor 405 is connected to a flywheel 406 in a known manner through an O-ring belt 407 and pulley 408 fixed on a shaft 424 journaled in the machine frame 11. The flywheel 406 is continuously rotated by the embossing motor 405 and is sized to provide kinetic energy which is utilized to supplement the torque of the motor 405 and drive the toggle linkage 403, 404 upon rapid actuation of the interposer assembly 300, as hereinafter described, to emboss a card placed by selectively moving the card between rams 422, 423 associated with the female and male plates 401, 402. The flywheel 406 thus obviates the need for a larger embossing motor with greater-torque and thereby permits the embossing machine to be more compact and lightweight.

Different characters on the embosser wheels 401, 402 are presented to the card surface in a known manner by rotation of a reversible D.C. positioning motor 409 having an encoder. The motor 409 is connected to the wheels 401, 402 through a belt 410. The wheels 401, 402 rotate together around respective shafts 411, 412 and have a pulley portion 461 around which the belt 410 is wrapped to define a 10:1 ratio between the motor 409 and the male and female plates 401, 402 so that precise but yet rapid movement of the wheels can be achieved. The wheels 401, 402 can also be provided with a portion for indenting cards, i.e. indenting characters slightly below the card surface in a known manner. When indenting is carried out, an indenting ribbon 413 is provided so that the ribbon material can be pressed into the indented portions to render the characters more visible.

The toggle links 403, 404 are connected at their driven end by a common pivot 414 and to an actuator lever 425 which rotates around a fixed pivot 419 journaled in the machine frame 11. At their respective actuation ends, the links 403, 404 are connected to relatively massive and rigid actuator levers 415, 416, respectively, pivoted on the shafts 411, 412 at pivot points 417, 418. The other end of the levers 413, 414 are connected to the respective upper and lower rams 422, 423 to effect embossing of the necessary character after the wheels 401, 402 have been rotated to the appropriate position by the motor 409.

Figure 9:
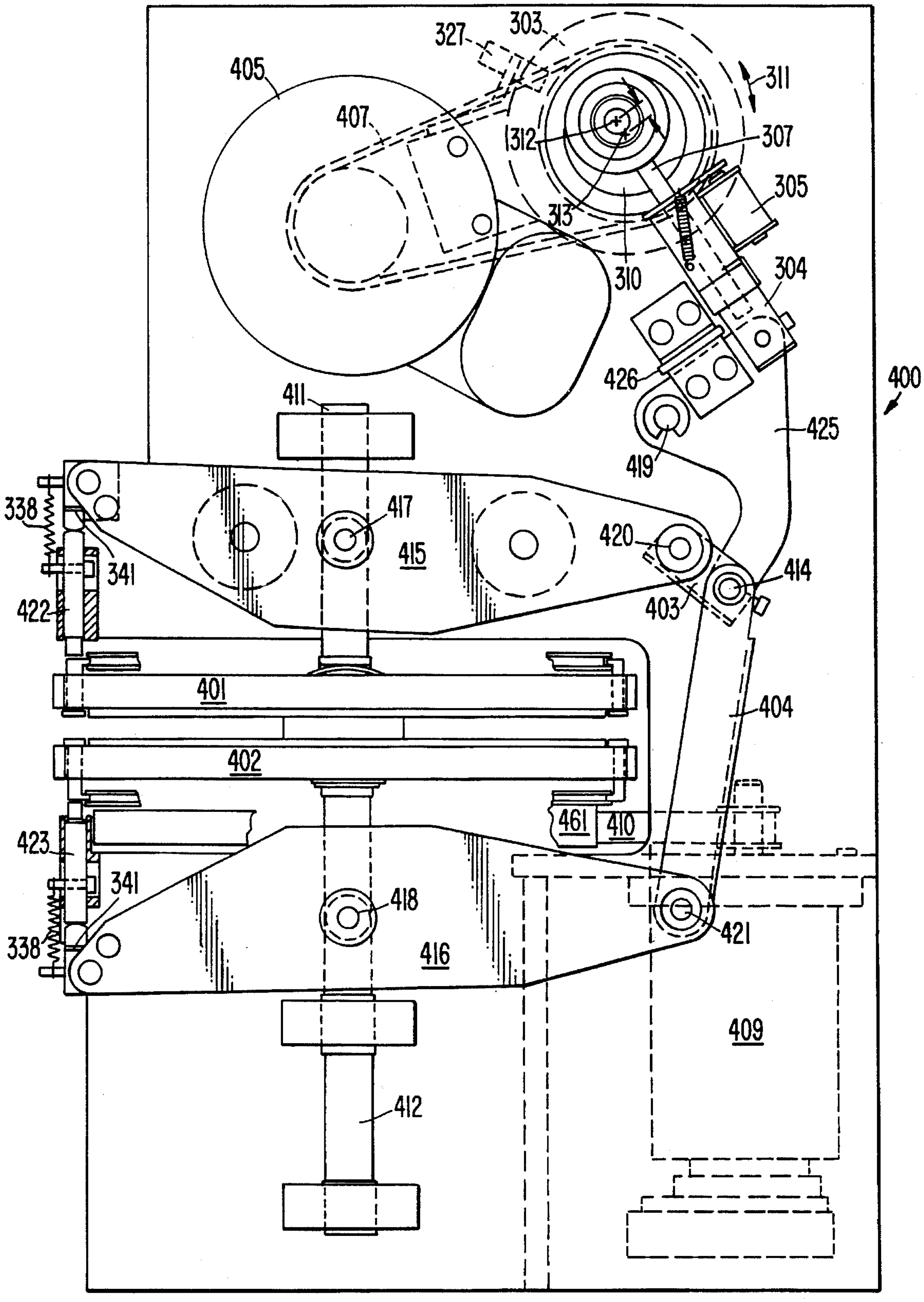
FIG. 9 is an isolated side elevational view of the embosser and interposer mechanisms shown schematically in FIG. 1 and also shown in FIGS. 6–8.
Figure 10C:
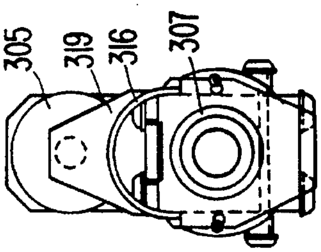
FIG. 10C is a side elevational view of the device shown in FIGS. 10A and 10B.
Figure 10A:
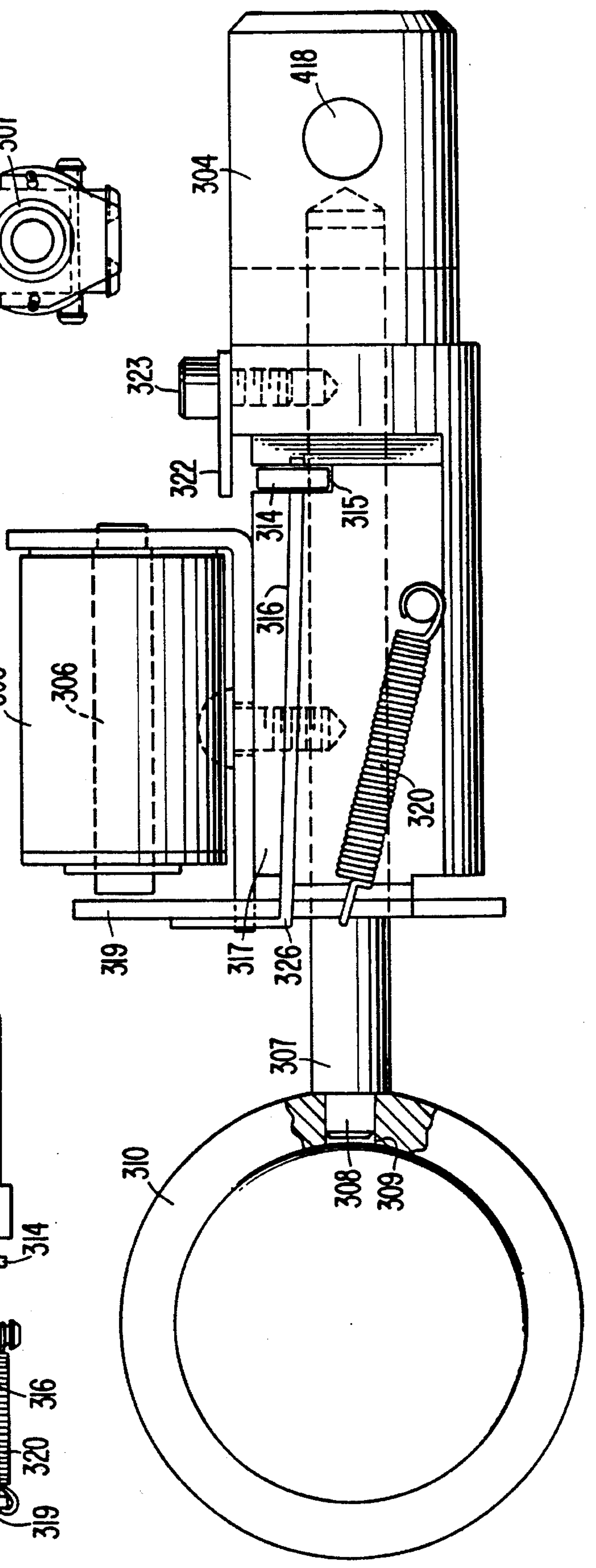
FIG. 10A is an isolated detail elevational view of the entraining device used in the interposer mechanism of FIG. 9.
Figure 10B:
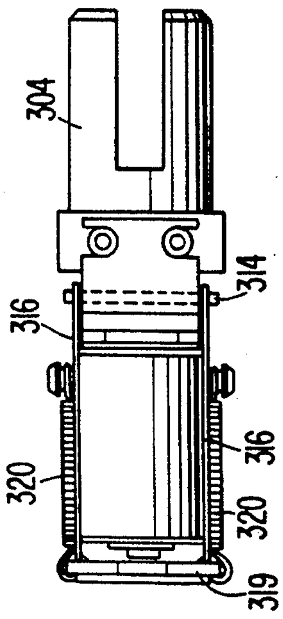
FIG. 10B is a top plan view of the device shown in FIG. 10A.
Figure 11:
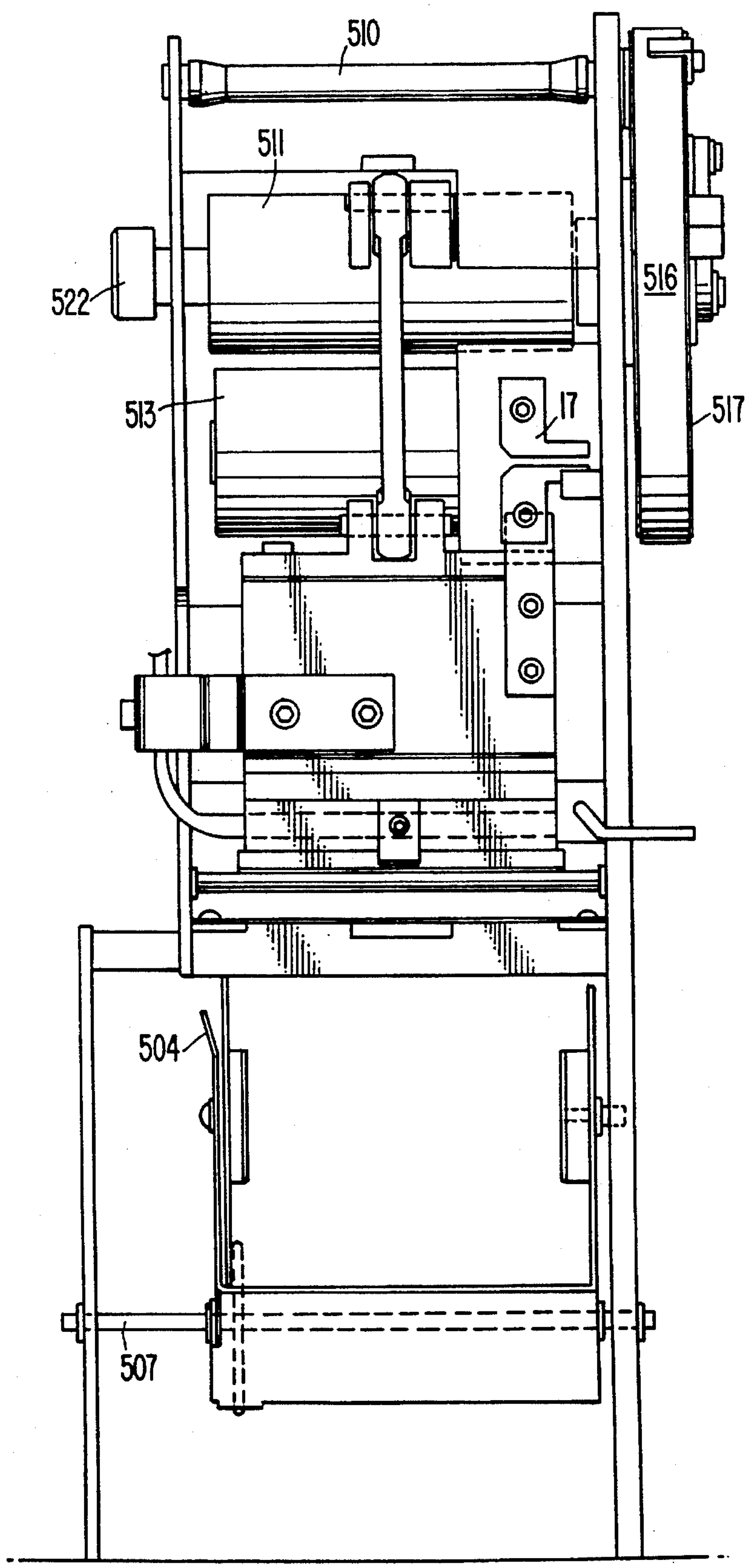
FIG. 11 is a more detailed front elevational view of the topper mechanism shown schematically in FIG. 1.

The embosser linkage described thus far is shown more specifically in FIG. 9 and consists of upper and lower four-bar linkages which are sized to provide a substantial amount of force, e.g. 300 lbs., at the rams 422, 423. Furthermore, a dwell is effected in that the actuator lever 415 brings the female ram 422 to its final position before the actuator lever 416 brings the male ram 423 to its final embossing position. A spring (not shown) can be associated with the link 404 or the link 425 so as to bias the linkage back to the solid line position shown in FIG. 9 upon completion of an embossing stroke.

The interposer assembly 300 which in the embodiment shown in FIGS. 1, 9 and 10A–C is arranged between the embossing motor 405 and the above-described embosser linkage is driven off the embossing motor 405 through a crank 301 mounted at the end of a shaft 302 connected to the driven flywheel 406 through a sensor disk 303 having a pulse counter 327. In order to provide a smaller motor to make the machine lighter and more compact, as noted above, the flywheel 406 which continues to rotate supplements the torque from the embossing motor 405 which would be insufficient for peak loads on the embosser assembly 400. Furthermore, since the torque loading is not constant in the embossing assembly 400, the flywheel 406 tends to make the torque loading more uniform and smooth out the operation of the embossing mechanism.

The crank 301 also continually rotates with the continuous rotation of the motor 405 and provides the driving mechanism for the hereinafter described interposer 300 which has a link 304 between the actuator lever 425 and the crank 301. The link 304 is pivoted at one end 418 to the actuator lever 425 which abuts against a stop 426 when the embosser linkage is in its non-actuated state. The link 304 has a magnetic coil body 305 mounted thereon with a magnetically permeable core 306 mounted centrally within the body 305.

A pin 307 is slidably mounted for rectilinear movement inside the link 304. The portion of the pin 307 which extends outside the link 304 has a reduced end portion 308 which is fixed by an interference fit or the like in an aperture 309 provided in the wall of a ring 310 inside of which is another ring 325 with bearings therebetween for transmitting the eccentric motion of the crank to the ring 310 through the shaft 302 rotated by the embosser motor 405 through the O-ring belt 407 and the pulley 408. The ring 310 has a translation motion component in the back and forth direction indicated by the arrow 311 in FIG. 9 due to the crank arrangement produced by the offset centers 312, 313 of the ring 310 and the shaft 302, respectively. The ring 310 will also have another component of motion which creates slight rocking movement of the link 304 around pivot 418.

The pin 307 is selectively locked within the aperture 309 by means of a locking gate 314 held in a close fitting recess 315 (e.g. a clearance of 0.005 inch) and connected to the link 304 through an actuating mechanism which includes an approximately L-shaped springy wire 316 such as music wire which can have two arms to form a U-shape arranged in a slot 317 provided axially along the link 304. The free end 318 of the wire 316 is connected to the locking gate 314. The other end 326 on the short leg of the wire 316 is connected with an armature plate 319 which is normally urged toward the end of the body 304 by a spring 320 connected between the armature plate 319 and a fixing pin 321 held inside the body of the link 304. The spring 320 normally pivots the armature plate 319 about a pivot point 326 in the counterclockwise direction as shown in FIG. 10.

A retaining member 322 is fixed by a screw 323 or the like to the outside of the link 304 to prevent the locking gate 314 from being removed from the recess 315 upon actuation of the magnetic coil 305 upon receipt of the appropriate signal. Actuation of the magnetic coil core 306 by a signal will pivot the armature plate 319 clockwise against the bias of spring 320 and will "load" the wire 316 by pressing it against the outer surface of the pin 307. Then when the recess 315 aligns with the locking gate 314 upon relative movement between the pin 307 and the link 304, the locking gate 314 will drop quickly into the recess 315 and provide a solid connection which forces the pin 307 and link 304 to move as one piece for actuating the toggle links 403, 404 of the embosser through actuator link 425. In other words, the bending of the wire 316 stores potential energy which brings about quick rotation of the wire 316 when embossing is to be carried out.

Conversely, when embossing is to cease, the magnetic coil core 306 is deactivated, and the spring 320 pivots the armature plate 319 counterclockwise, thereby pulling the locking gate 314 quickly out of the recess but not past the retaining member 322. At this time, the pin 307 will move relative to link 304 and prevent movement of the actuating link 425 because there is no rigid connection between the relatively movable pin 307 and link 304.

When it is desired, for example, at least every other revolution of the interposer crank 301 to transmit torque to the toggle links 403, 404 for effecting the ram action on the embosser wheels 401, 402, the core 306 is actuated so that the wire 316 is biased toward the pin 307 before the recess 315 is aligned with the locking gate 314 enabling the locking gate 314 to move quickly into the recess 315 and reestablish a driving connection between the pin 307 and link 304. The flywheel 406 provides enough kinetic energy in the form of torque that it would be possible to emboss up to five characters before the interposer 300 is intermittently disconnected from the toggle linkage 403, 404.

The interposer sensor disk 303 and sensor 327 are arranged at the shaft 302 to provide signals to a controller 3 (FIG. 21) so that the coil 305 can be triggered in proper relationship to the crank 312.

As previously noted, toggle links 403,404 of the embosser 400 are connected at pivot 414 to one end of the actuator lever 425 of the interposer 300. The actuator lever 425 is pivoted at a mid-point around a pivot pin 419 which is fixed to the machine frame 11. The end of the linkage 403 is joined to the female actuator lever 415 at pivot 420, whereas the linkage 404 is joined to the male actuator lever 416 at pivot 421. The linkage described permits the female embosser wheel ram 422 to stand still or dwell during the remaining portion of the upward motion of the male embosser wheel ram 423. Analytically, an upper 4-bar linkage is constituted by the actuator lever 425, with an imaginary line joining the stationary pivots 417, 419 and constituting the base, the lever 415, and the link 403, and the lower 4-bar linkage is constituted by the actuator lever 425, the link 404, with an imaginary line joining the stationary pivots 418, 419, and constituting the base and lever 416. The connection and disconnection between the interposer 300 and embosser 400 via the magnetic coil 305 continues until all the embossed and intended characters have been formed. In this connection, discussion regarding the indenting operation has been dispensed with since it is similar to the embossing operation except that the characters are not raised on the card but are merely slightly depressed below the card surface and highlighted by an indenting ribbon.

If, as previously mentioned, a defect occurs in the embossing/indenting operation, the card is returned to the reject stack as shown by the flow diagram in FIG. 5, and a new card is retrieved for encoding, embossing and the hereinafter described topper operation. If, however, the card is determined to be defect free after embossing and indenting, it is then moved by the carriage 101 to the topper assembly 500 where the foil is adhered by heat to the raised embossed characters created by the embossing operation.

Figure 22:
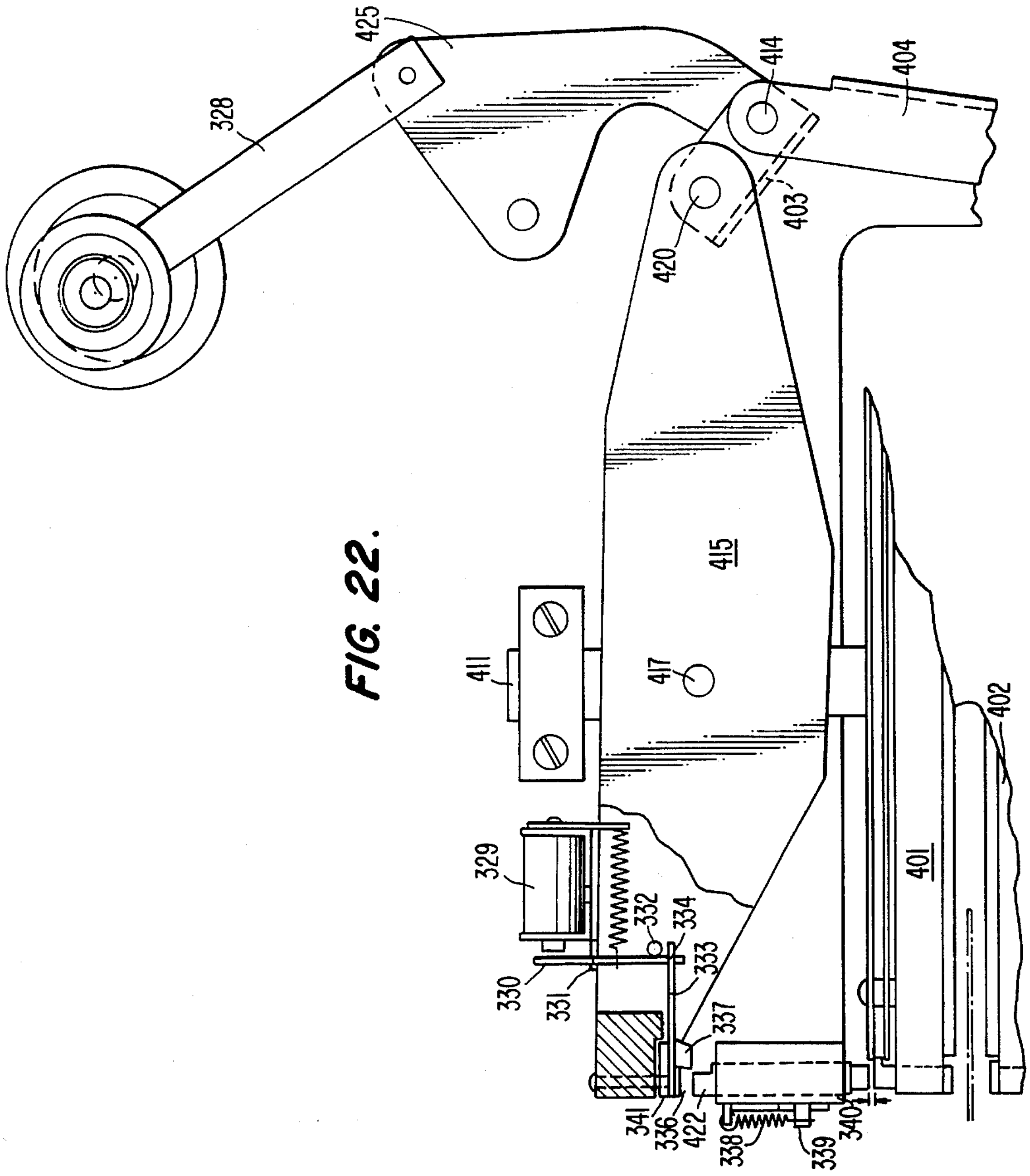
FIG. 22 is a side view of another embodiment of an interposer mechanism.
Figure 23:
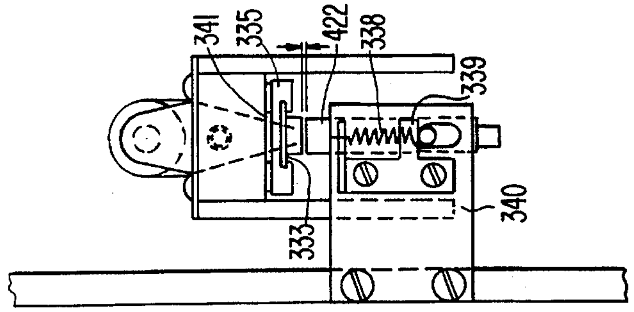
FIG. 23 is a front view of the interposer mechanism of FIG. 22.

In an alternative embodiment of the interposer and embosser assembly shown in FIGS. 22 and 23, the link 304 and pin 307 of FIGS. 9 and 10 are replaced with a solid link 328, although the remaining linkage is the same. A magnetic coil 329 is mounted on the lever 415. An armature 330 is mounted so as to pivot about a point 331. A stop 332 is mounted on the lever 415 to prevent counterclockwise motion of the armature 330 beyond the substantially vertical position shown in FIG. 22. An interposer slide 333 is pivoted at point 334 at the bottom of the armature 330. The slide 333 is horizontally arranged and slidable within guide blocks 335 held by conventional fastening means at the end of the lever 415. Upon actuation of the magnetic coil 329 to rotate the armature 330 clockwise around pivot 331, the slide 333 is pushed forward to a position over the ram 422 held between the lever 415 a small distance will now be communicated to the ram 422 by the presence of the slide 333 therebetween in the space 336 which otherwise is sufficient to prevent contact between the lever 415 and the ram 422. A projection 337 is provided at the end of the slide 333 and is sized to slide snugly in the space 336 between the lever 415 and ram 422.

A similar interposer arrangement is employed in conjunction with the male wheel 402, although the projection at the end of the interposer slide may be sized differently from projection 336 due to the fact that the lever 416 associated with the male ram 423 travels a greater distance than the end of the lever 415. This lower male wheel arrangement is not shown in FIG. 22 because in all other respects it is identical to the structure illustrated in that figure with respect to the upper female wheel arrangement. Furthermore, the rams 422, 423 are biased away from the embossing position after the levers 415, 416 are moved to an open position by a spring 338. An adjustable stop 339 on a bracket 340 holding the rams 422, 423 securely on the machine frame 11 is provided to adjust the gap of about 0.010 inch between each ram and its associated slide 353. For adjusting a gap of about 0.010 inch between the rams and the character type, shims 341 can be inserted between the guide blocks and the respective levers 415, 416.

The Topper Assembly

The topper assembly 500 applies a topping or hot stamping foil to the top of the embossed characters with a force of about 50 lbs. and comprises a foil supply spool 501 which is rotatably mounted on an unwind assembly 504. In FIG. 1, the unwind assembly 504 is pivotally mounted around a shaft 507. In the normal condition, i.e. when the foil is not being advanced or a card is not being topped, the unwind assembly will pivot backwards or in the counterclockwise direction, as viewed from the left side of FIG. 1, either by the weight of the spool whose center of gravity is rearwardly of the shaft 507 or with the aid of a stripping spring 505. A limit stop 506 on the frame prevents the unwind assembly 504 from pivoting backward beyond the amount needed to strip the foil as hereinafter described.

The leading edge of the spool 501 is threaded around a heated platen 508, and idler rollers 509, 510, and is then taken up on a spool 511 after an appropriate amount of the foil has been used. The platen 508 is heated by electric coils 512 and is movable towards and away from the foil 501 and the card resting on the platform 502 by an actuating mechanism which includes a motor 513, an output shaft 514 with a toothed pulley 515 fixed thereto, toothed a belt 516 meshing with the pulley teeth around the pulley 515 and a larger toothed pulley 517 attached to an eccentric crank mechanism 518 to actuate a ram 519 through a link 529. This mechanism moves the platen 508 toward the topper platform 502 with the foil and an embossed card therebetween to effect topper action and transfer foil to the top of the embossed characters only.

Figure 12:
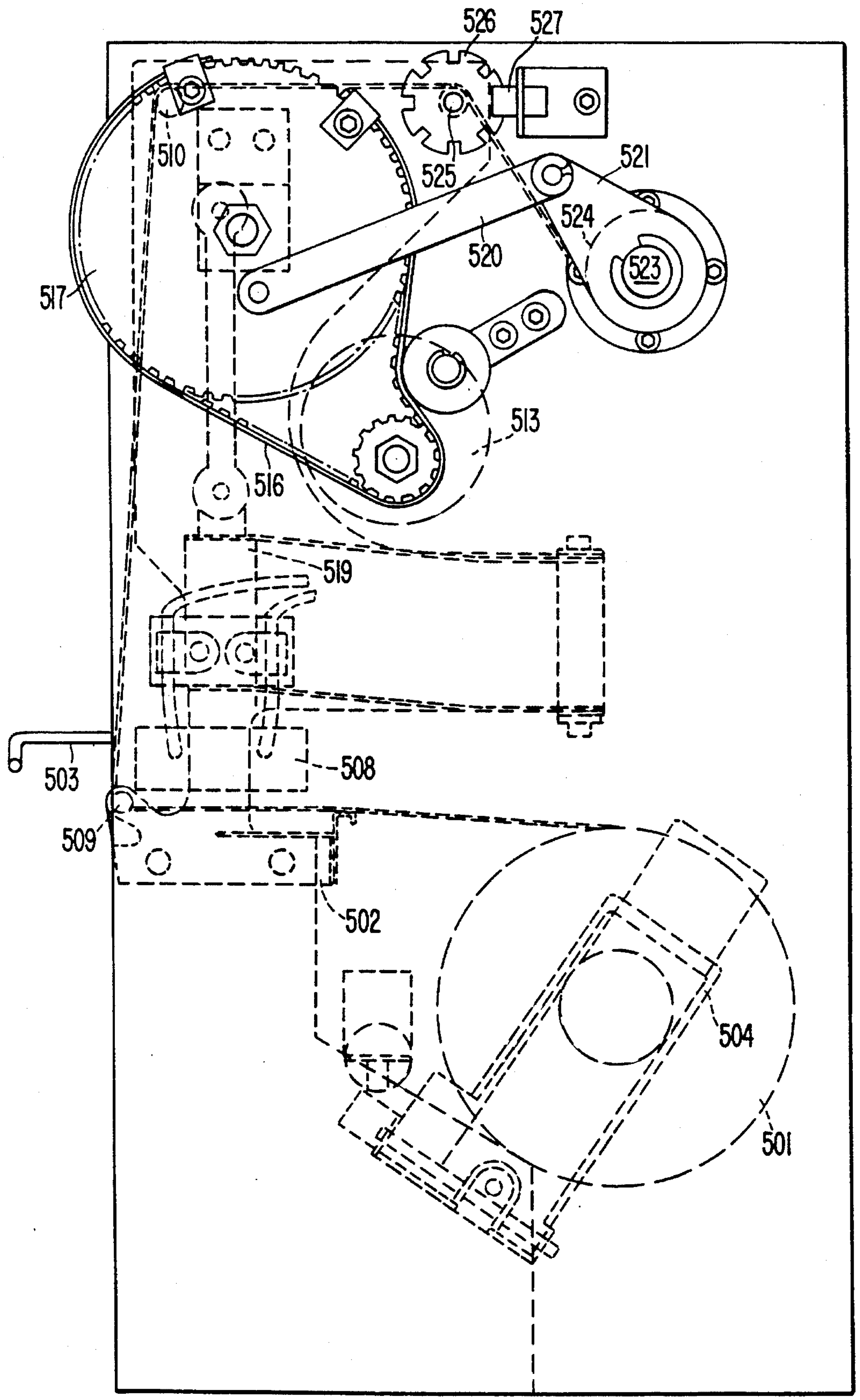
FIG. 12 is a side elevational view of the topper mechanism of FIG. 11.

The larger toothed pulley 517 has one end of a link 520 eccentrically pivotally mounted thereon as shown in FIG. 12. The other end of the link 520 is pivotally connected to a crank arm 521 which is fixed to a shaft 522 for the take-up spool 511 via two one-way Torrington clutches 523, 524 to act as a foil feed ratcheting mechanism as hereinafter described. The used foil is taken up after the motor 513 has been actuated to move the ram 519 downwardly and push the heated platen 508 against the foil on top of the embossed characters and the motor 513 is then actuated to move the ram 519 to a midpoint in the upward stroke. During this movement from the bottom position of the ram 519 to a mid-stroke position of the ram 519 in the upward direction, the unwind assembly 504 pivots rearwardly through the weight of the foil roll 501 and/or with the aid of the stripping spring 505 so as to pull the used foil web on the topped card away from the card and to allow winding up of the foil on the take-up spool 511. Furthermore, due to the location of the link 520 on the pulley 517, only a very small amount of winding movement of the foil takes place in movement between the mid-stroke and bottom position and vice-versa. However, further movement of the ram 519 above its midpoint position results in much greater foil take-up on the spool 511 due to the arrangement of the link 520 on pulley 517 and the connection of the link 520 to the crank arm 521.

The used foil 511 is threaded around a shaft 525 connected to a pulse wheel 526 associated with a counter 527 so that frictional engagement between the foil and the shaft permits sensing of how much foil is being wound up on spool 511. The unwind assembly 504 which is pivoted around the shaft 507 exerts substantially constant tension on the foil web.

Prior to the first topper operation upon start-up of the machine when no card is on the topper platform 502, the carriage 101 moves forward on the "Y" axis to line up with the ejector slide 503 as shown in FIG. 2 so that the ejector slide 503 engages an ejector pin 154 mounted above the roller 150 on the carriage 101. The carriage is then moved forward in the "Y" direction, and the ejector pin 154 on the carriage 101 moves the ejector slide 503 forward. This distance of movement is typically about 2 inches in the "Y" direction. The ejector slide 503 is normally biased to the rear of the machine by a spring (not shown) and is connected to an ejector 528 (FIG. 2) which has a surface 531 disposed longitudinally along the upper surface of the topper platform 502 so as to move in a direction parallel to the rod 503 when the carriage 101 is moved forward in the "Y" direction. The surface 531 can be provided with projections 532, 533 which extend over each side of the card so that the card will be held against the topper platform 502 when the used foil web is stripped from the card.

Then, the carriage 101 moves to the left in the "X" direction and forward in the "Y" direction against the actuator 142 to unclamp the card and then back in the "Y" direction where the unclamped card still on the carriage 101 has been aligned with the topper assembly 500 and is now put on the topper platform 502. The ram 519 is then moved down to clamp the card with about 50 lbs. of force as the carriage 101 is withdrawn and moved to the new card supply hopper 201 to pick up a new card to repeat the process. In the meantime, the card which has just been deposited on the topper platform 502 is topped with foil from the spool 501 and is removed by the ejector 528 when the carriage 101 returns with a new card and the ram 519 has been moved up no higher than its midpoint to unclamp the topped card and to strip the used foil.

As was previously mentioned, the foil web which adheres to the card after the topper operation is stripped by movement of the unwind assembly 504 upon upward movement of the ram 519, whereupon the foil web is taken-up on the take-up spool at first slowly up to about the midpoint of the movement of ram 519 and then more quickly. The embossing width W (FIG. 2) of the next card placed on the topper platform 502 is stored in memory as was the embossing width M of the previous card which has already been topped and provides a control signal which causes the reversible D.C. motor 513 to oscillate so that the ram 519 is moved only partially up and down but not so as to contact the card on the topper platform 502 or to have the ram 519 reach the top of its stroke. The oscillation of the motor 13 causes the link 520 and crank arm 521 to oscillate. However, due to the presence of the two one-way clutches 523, 524, a ratcheting movement occurs in which the foil is allowed to be taken up on the spool 511 in one oscillatory direction but there is no take-up of the foil in the other direction.

The pulse wheel 526 which is on the shaft 525 frictionally engaging the foil web rotates as the foil is taken up to provide a signal to the motor through the sensor 527 when the proper amount of used foil has been advanced for the next topper operation to occur. Therefore, the motor 513 can be actuated to feed the ram 519 against the new foil and the new card on the topper platform 502. In other words, the foil feed automatically adjusts to the embossing width which can now be different for each card inasmuch as that width is kept track of by counting pulses which correspond to the amount of foil take-up for controlling the topper motor 513 and minimizing the amount of foil used per topper operation.

A ram sensor 529 is also provided to sense the end positions of the ram 519 as it oscillates through the crank mechanism 518 between top and bottom end positions of its stroke. The signal from sensor 529 can be supplied to the machine controller for assuring that the lowering and raising of the ram 519, as well as the oscillatory motion of the link for advancing the foil, are synchronized with the presence of a card on and removal of the card from the topper platform 502 so that when desired the ram 519 will not be allowed to go all the way down in its stroke toward the topper platform 502.

Figure 26:
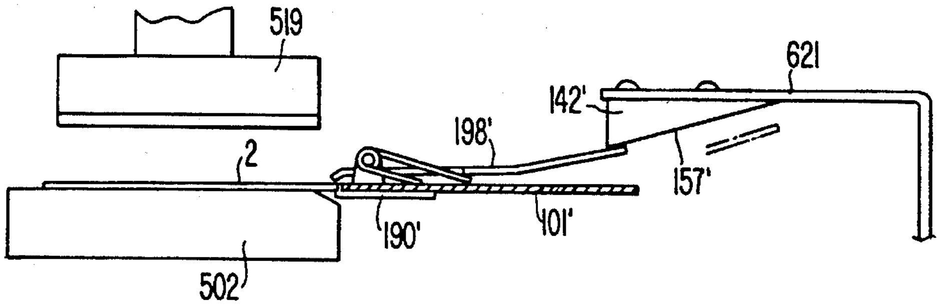
FIG. 26 is a partial cross-sectional side view of the carriage of FIG. 24 in conjunction with a clamp opening cam at the topper assembly.

With the carriage 101' shown in the embodiment of FIGS. 24 and 25 the card is inserted onto the topper platform 502 in the manner shown in FIG. 26. An actuator 142' is mounted on the machine cover in the area of the stacker and has a cam surface 157' similar in configuration to the camming surface 153' shown in FIG. 25 and described above. The carriage 101' arrives at the topper assembly 500 to the right of the actuation 142' in the "Y" direction. The carriage 101' is then moved rearwardly in the "Y" direction (to the left in FIG. 26) whereupon the free end 199' of the movable jaw 198' is pressed clockwise against the bias of torsion spring 196' to open the jaws. In the position shown in FIG. 26, the jaws have fully opened and are kept open (i.e. no cam drop) by the camming surface 157' and the card is on the topper platform 502 where the ram 519 is brought down to exert pressure on the card and clamp the same against the platform. Thereupon the carriage 101' is moved forward (to the right) with the movable jaw 198' pivoting slowly counterclockwise under the bias of spring 196' to the closed position. The carriage can thereupon be moved in the "X" direction into alignment at the new card supply hopper 201 as shown in FIG. 25 but to the right of the camming surface 153' and then moved rearwardly in the "Y" direction (to the left in FIG. 25) to pick up and clamp a card between the jaws.

The Stacker Assembly

Figure 17:
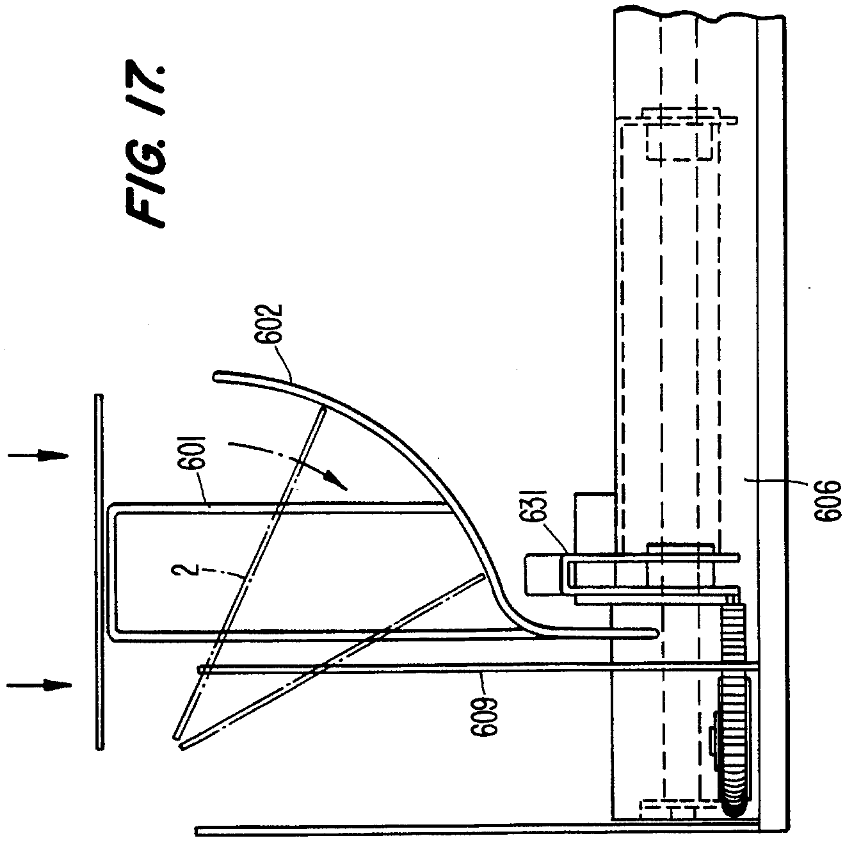
FIG. 17 is a detail front view of the card drop shown schematically in FIG. 2.

According to one embodiment of the invention, a first and second pair of guide wires 601, 602 (FIGS. 2, 17 and 18) are arranged adjacent the front of the topper platform 502 at the left of the machine 10. The first pair 601 has a shallow inclined portion 607 for a small distance (at least the width of a card) extending from the topper platform 502 and then through a steeper transition to a more nearly vertical portion 608. The other pair of guide wires 602 has an arcuate shape (FIG. 17) and is transverse to the first pair of guide wires 601. A plate 609 extends along one side of the first pair of guide wires 601 to present a striking line 610 so that a card being ejected from the topper platform 502 is guided at the left end of the machine by the striking line 610 for the first swing of the card as it "waterfalls" or tumbles from the platform 502 after being ejected from the topper mechanism 500.

Figure 18:
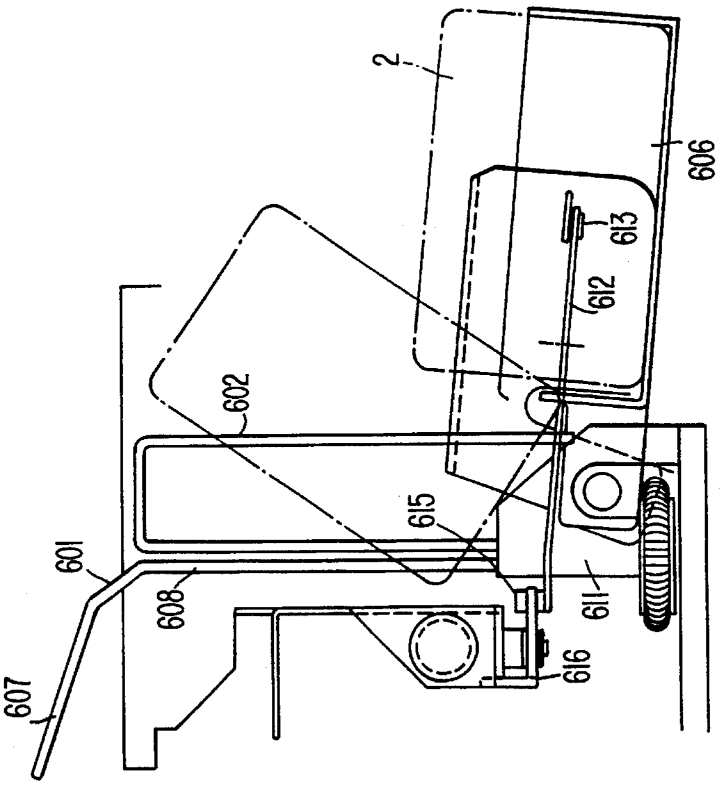
FIG. 18 is a side view of the card drop shown in FIG. 17 with the card tumbling into the stacker tray.

A striking block 611 as shown in FIG. 18 is provided at the bottom of the guide wire pair 602 so that as the descending card pivots the edge of the card will hit the striking block 611 as shown in FIG. 18 and tumble into the stacker channel 606.

A feeder 605 pushes the card which has just tumbled into the channel 606 by actuation of a linkage 604. Movement of the carriage assembly 100 to the left to place a card on the topper platform 502 actuates the linkage 604 which includes a dog-leg shaped link 612 pivotally connected at one end via a link 630 to the plate 605 and pivot point 613 and pivoted to the machine frame 11 at pivot point 614. The other end of the link 612 has a button 615 projecting therefrom. An actuating member 616 is moved by motion of the carriage assembly 100 toward the left as the carriage 101 moves to put a card 2 on the topper platform 502. The actuating mechanism 616 contacts the button 615 and causes the link 612 to rotate counterclockwise to the dotted line position shown in FIG. 19 to push the newly dropped card in the stacker channel 606 to the right past a spring clip retainer (not shown) which prevents the card from moving to the left and against a spring biased plate 631 which moves toward the right as more cards are added to the stack and make room for a new card to waterfall along the guides 601, 602 into the channel 606.

As previously mentioned, the right side of the stacker assembly 600 also includes a magazine 617 for the rejected cards returned after an unsatisfactory magnetic stripe encoding operation or an unsatisfactory embossing/indenting operation. When the machine deems it necessary to reject a card, the carriage is returned to the right along the "X" axis and is then moved forward in the "Y" direction where the clamping device 132 is opened by contact with the actuator 143 to release the card from the clamping device 132 and upon further movement in the "Y" direction contacts the upstanding projections to move the wire 165 rearward relative to the carriage 101 to push the card out of the carriage and to allow it to slide down the inclined ramp 603 on the stacker assembly 600.

Figure 4A:
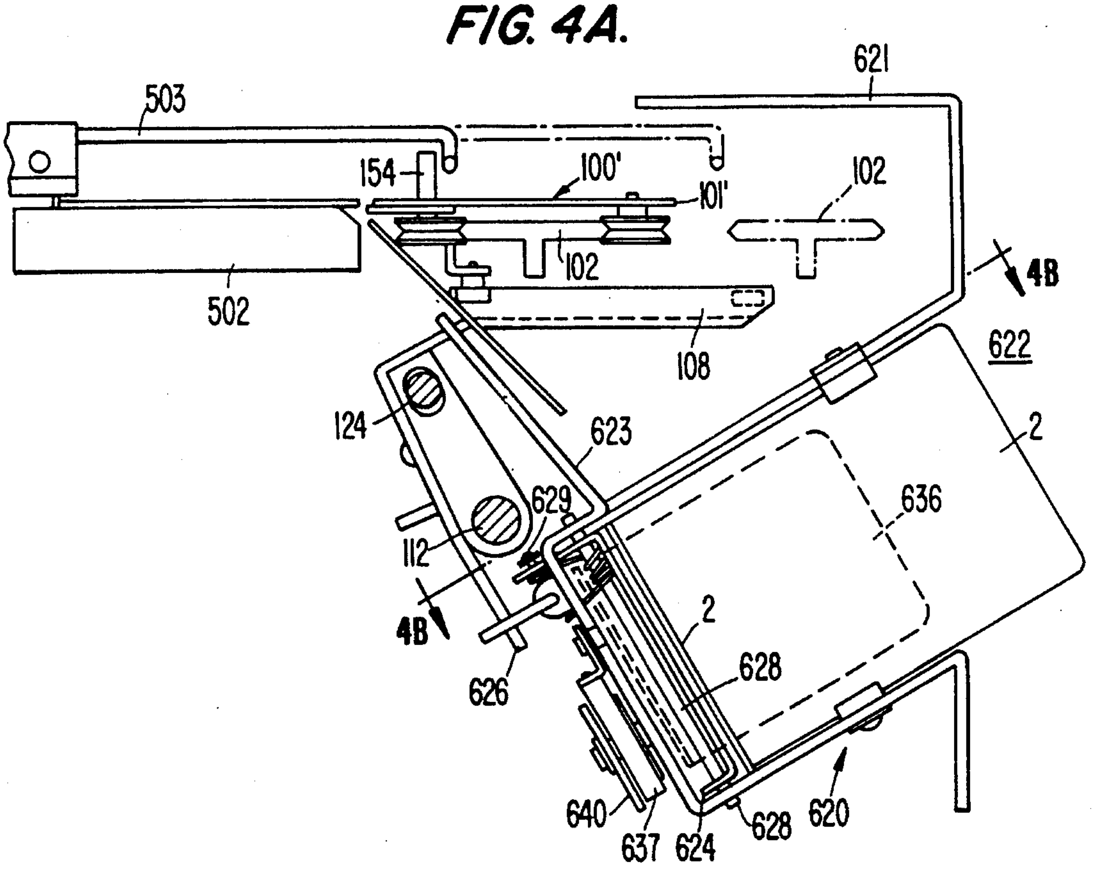
FIG. 4A is a partial cross-sectional side view of the assembly shown in FIG. 3.
Figure 4B:
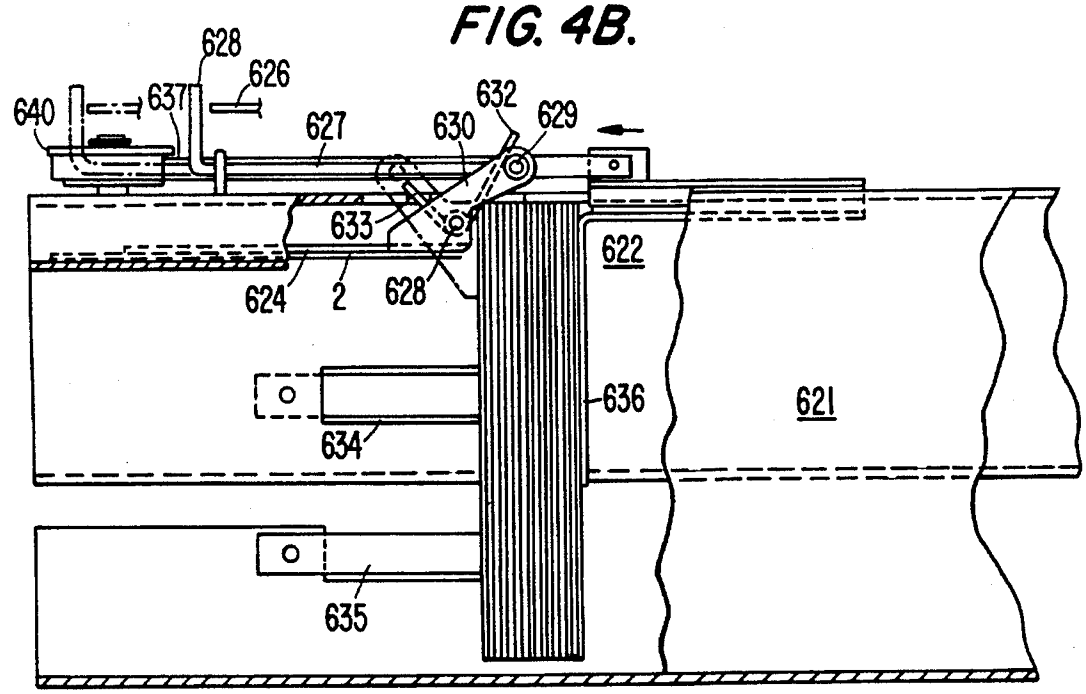
FIG. 4B is a view taken along line 4B—4B of FIG. A.

In another embodiment of the present invention as shown in FIGS. 3, 4A and 4B, an angular stacker assembly 620 is employed in lieu of the horizontal stacker of FIG. 2. The assembly includes a cover member 621 which defines a card channel 622. Instead of guide wires for tumbling the cards into the stacker, this embodiment utilizes a straight drop of the cards from the topper platform 502 into the channel 622. Upon ejection from the topper platform 502, the topped card slides down a plate 623 through a slot in the cover 621 and comes to rest against a loader 624 which is normally biased by a torsion spring 625 to the position shown in FIGS. 4A and 4B. Upon movement of the carriage assembly 101 in the "X" direction to load a new card on the topper platform 502, an appendage 626 on the carriage assembly 101 comes into contact with an L-shaped end 628 of a slidable connecting link 627 connected with the stacker assembly 620. The other end 629 of the link 627 is pivotally connected with one end of an arm 630. The other end of the arm 630 is connected with the loader 624. The arm 630 and loader 624 are pivoted about a shaft 628 fixed at the top and bottom of the stacker channel 622 with the torsion spring 625 arranged around the shaft 628. One arm 632 of the torsion spring 625 abuts the pivoted connection between the link 627 and the arm 630, while the other end 633 of the torsion spring engages the fixed frame of the stacker assembly.

When the carriage 101 is moved to the left in FIG. 4B, the appendage 626 on the carriage assembly 101 engages the link 627 and moves the latter to the left. This movement causes the arm 630 to pivot counterclockwise around shaft 628 while compressing the torsion spring arms 632, 633 toward each other. The pivoting of arm 630 causes pivoting of the attached loader 624 toward the right so that a card resting thereagainst is moved past upper and lower spring retainers 634, 635, respectively, and against the bias of a stack holder plate 636 which is biased toward the left by a light negator spring 637 attached to the plate 636 at one end and around a pulley 640 to the machine frame 11 to maintain the upright condition of the stack of cards along with the spring retainers 634, 635.

Figure 27:
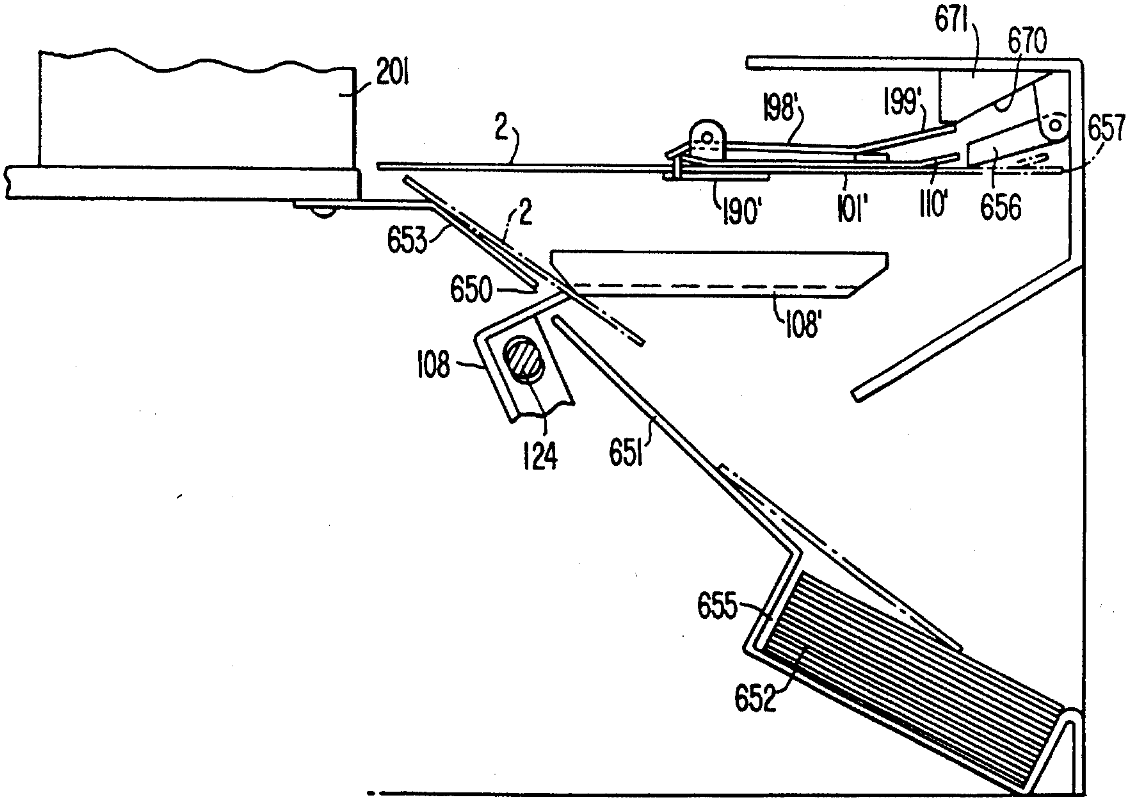
FIG. 27 is a partial cross-sectional side view of the carriage of FIG. 24 with a modified form of reject stack.

With the embodiment of the carriage 101' shown in FIGS. 24 and 25, a simple mechanism of the type shown in FIG. 27 can be used to put defective or unacceptable cards into a reject stack in the stacker channel. In particular, an opening 650 in a guide plate 651 permits movement of the blade 108' of the carriage assembly 100' forward in the "Y" direction so as to engage the free end 199' of the movable jaw 198' under a camming surface 670 of a member 671 fixed on the machine frame cover and to open the clamping device 132'.

A reject stack 652 is aligned with the hopper 201 and is provided at the end of the guide plate 651. Another guide plate 653 is attached to the hopper 201 to cooperate with the guide plate 651. The opening 650 between the guide plates 651, 653 is such as to permit motion of the carriage blade 108 to the right in FIG. 27 (i.e. forward in the "Y" direction). A reject stacking channel 655 is mounted at the end of the guide 651 such that a rejected card sliding down the guide plates 653, 651 falls smoothly into the channel 655 which is angularly disposed to a horizontal plane and into the stack 652.

A gravity actuated pawl 656 is pivotally mounted at the front of the machine frame 11 in proximity to the camming surface and in alignment with the ejector tabs 110', 111'. When the carriage 101' is brought back to the area of the reject stack 655, the pawl 656 engages one of the tabs to keep the ejector 146' as the carriage 101' continues to move to the right. This relative motion between the ejector 146' and the carriage 101' by means of the shoulder bushings 147', 148', 149' pushes the defective card out of the carriage 101' and onto the guide plate 653 where gravity causes the card to slide smoothly into the reject stack 652. The dotted lines designated by the numeral 657 indicate the extreme start and finish position of the ejector tabs when the carriage is in its forwardmost "Y" direction position.

In the event that a topper assembly 500 is not used, a similar ejection mechanism can be used at the left side of the stacker channel in alignment with the stacker embodiment shown in FIGS. 2, and 17–19 or the embodiment shown in FIGS. 3, 4A and 4B where the card will tumble or slide into the stacker channel. In this case, the pawl 656 will be on the left side of lever 198 and will act on tab 110'.

Machine Control

Figure 21:
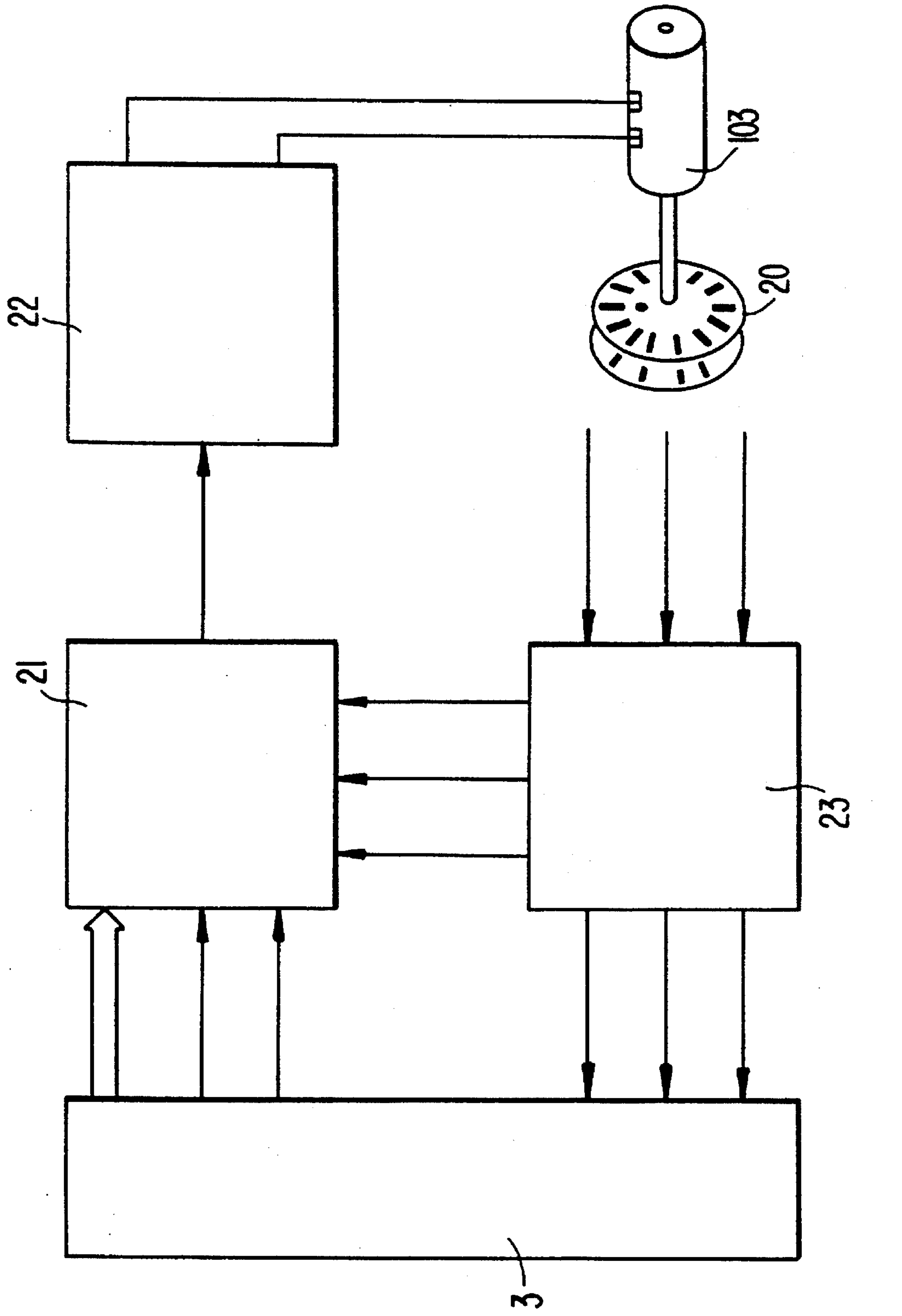
FIG. 21 is a block diagram of the controller and associated circuitry for operation of the positioning motors in accordance with the present invention.

The actual control of the machine is accomplished with conventional microprocessor DC motor servopositioning systems of the type shown in FIG. 21 which operates in two modes to provide both fast and accurate positioning of the above-described components. Each of the DC positioning motors 103, 121, and 409 have, as previously noted, optical encoders 20 which is controlled by the microprocessor controller 3 which determines the optimum speed profile for each motor movement and passes appropriate commands to a D/A converter and errors amplifier 21. The converter/amplifier 21 generates a voltage control signal to drive a switchmode driver 22 which powers the associated motor. An optical encoder 20 on each DC positioning motor shaft provides signals which are processed by a tachometer converter 23 to produce tacho voltage feedback and feedback position signals for the D/A converter 21 plus distance/direction feedback signals for the microprocessor controller 3.

This type of system can operate in two modes to achieve the high speed and accuracy necessary for motor positioning in an embossing machine. Initially the system operates in a speed control mode. Movement begins when the microprocessor controller 3 applies a speed demand word (a number of bits) to the D/A converter 21, typically calling for maximum speed. At this instant the motor speed is zero so that there is no tacho feedback. Thus the motor operates in an open loop mode in which a high current peak accelerates the motor rapidly to ensure a fast start. However, as the motor accelerates the tacho voltage rises, and the system then operates in a closed loop speed mode moving rapidly forward toward the target position, e.g. along the "X" or "Y" direction to the hopper 201, the embosser 400 or the topper 500. The controller 3 which monitors the signals from each optical encoder 20 reduces the speed demand word gradually when target position is close. Each time the speed demand word is reduced, the motor is braked by the speed control loop. Finally, when the speed code is zero and the target is extremely close, the controller 3 commands the system to switch to a position mode where the motor stops rapidly at the desired position and is held in an electronic detent.

The optical encoder 20 comprises a rotating slotted disk and a partially slotted fixed disk of known construction. Light sources and sensors are mounted so that the encoder generates two quasisinusoidal signals with a phase difference. The frequency of these signals indicates rotational speed, and the relative phase difference indicates rotational direction. A third signal consisting of one pulse per rotation is used to find the absolute position at initialization of the motor For sequential operation of the machine with the above servopositioning control of the motors 103, 121, 409 and 513 to achieve the volume of production desired, it is necessary to provide sensors of conventional construction at certain points on the machine. For example, "Y" direction limit sensors 12, 13 are placed at the desired end of travel of the carriage 101 from the front to back of the machine. A card present sensor 14 is placed between the hopper 201 and carriage assembly 101 to assure that a card has been pushed from the hopper 201 onto the carriage or else the machine will not cycle. An embossing motor sensor 15 can be placed in proximity to one of the wheel actuating levers 415, 416 to sense ram actuation. Likewise, a wheel position sensor 16 can be arranged on one of the embosser wheels 401, 402 to assure that the wheels are rotating to the desired position to present the appropriate character for an embossing operation. A ram position sensor 17 is employed in the topper assembly 500 to sense the position of the ram and ram link for effecting the topper operation and the oscillatory motion of the crank 521 for foil take-up. Finally, the previously described interposer sensor disk 303 and sensor 326 provide a positional reference for actuation of the interposer 300 throughout the embossing operation.

The controller 3 selectively controls the operation of the "X" direction motor 103, the "Y" direction motor 121, the embossing wheel positioning motor 409 and the topping motor 502 in the manner described with reference to FIG. 21. A memory in the controller 3 stores the home position of the carriage 101 after initialization of the machine 10 and the current positions of-the "X" and "Y" direction motors 103, 121, relative to the home position established upon initialization or start-up of the machine 10 so that during a continuous run of the machine, i.e. without a power shut down, the motors 103, 121 remember their current position relative to the home position. The system also stores the number and type of characters which are to be embossed upon individual cards along with the required spacing for each card.

Figure 5:
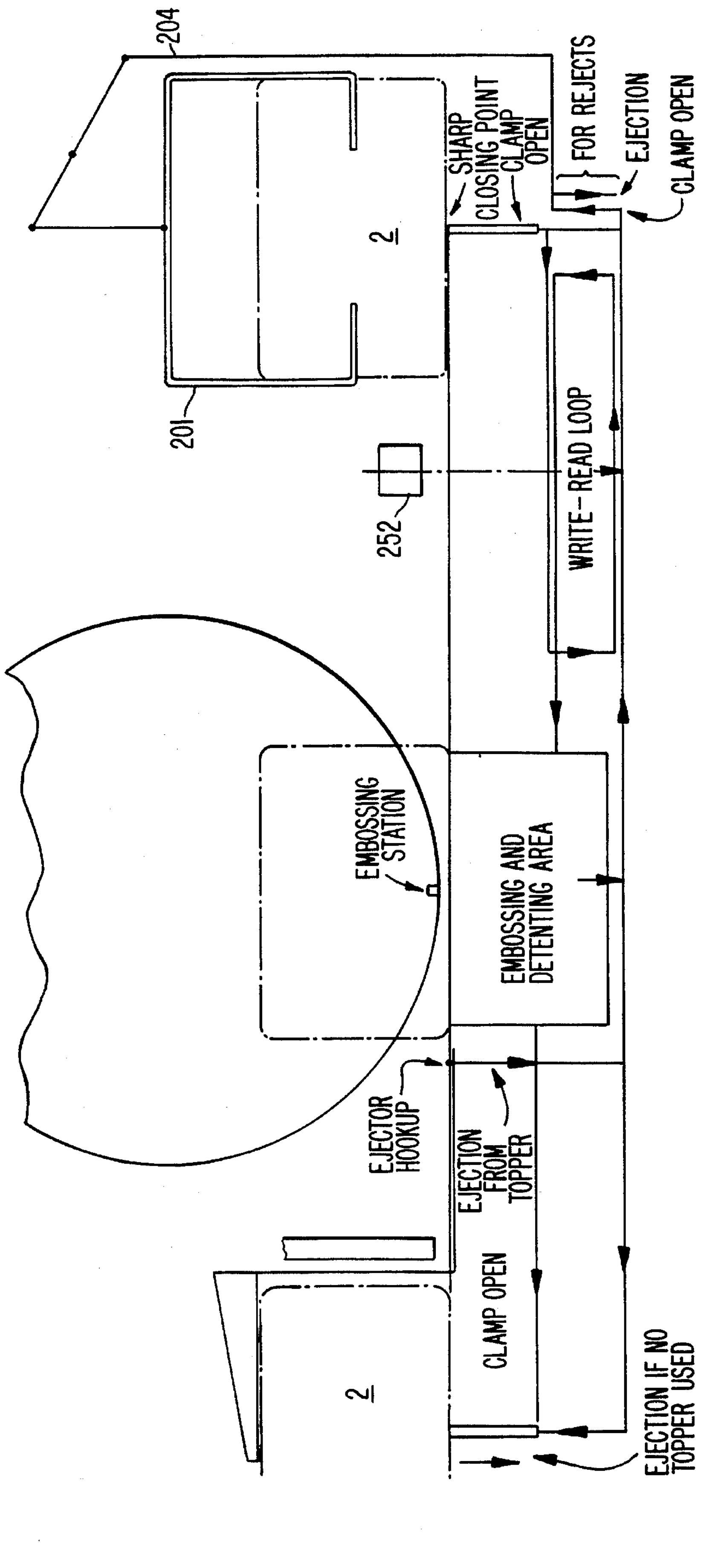
FIG. 5 is a schematic diagram of a typical travel cycle of the carriage mechanism of the compact embossing machine in accordance with the present invention including the reject cycle.

During the card processing operation cycle which is shown schematically in FIG. 5, the carriage 101 will upon initialization move back toward the new card supply hopper 201 and pick up a protruding blank card 2 which has been pushed forward partially out of the bottom of the hopper by the protrusion 133 acting on the linkage 204 as the carriage is advanced toward the hopper 201. The carriage 101 picks up the card advanced from the stack 202, and the blank card is clamped by the clamping device 132 at the end of the carriage motion toward the hopper 201.

Then the carriage moves forward in the "Y" direction to withdraw the card blank completely from the hopper 201. The photosensor 14 determines if a card is present in the carriage 101. If no card is detected, the controller 3 actuates the carriage 101 forward in the "Y" direction to open the clamping device 132 and then backward toward the topper 201 to push out a card and pick up a new card. If a card is detected by the photosensor 14, the "X" direction motor 103 is then actuated to move the carriage 101 to the left to encode data on the magnetic stripe with the head 252. The motor 121 is actuated to move the carriage 101 frontward along the "Y" direction to clear the head 252, the motor 103 is actuated to move the carriage 101 back to the right of the head 252 in the "X" direction, the motor 121 is actuated to move the carriage 101 toward the back in the "Y" direction to position the blank card 2 in line with the read head 252, and then the motor 103 is actuated to move the carriage 101 through the head 252 in the "X" direction to verify the information on the stripe. If the information cannot be verified on the first read pass, the verification step can be repeated in the aforementioned manner. However, after the second verification pass without proper verification, the motor 121 is actuated to move the carriage 101 forward in the "Y" direction to clear the head 252 and then the motor 103 is actuated to move the carriage 101 rightwardly in the "X" direction to a position in front of the reject stack 603 in the stacker channel 600 (FIG. 2) or channel 620 (FIG. 3).

If the encoded blank card 2 has been verified or accepted after the first or second pass, the motor 103 will move the carriage 101 leftwardly to the embosser assembly 400 where the card is embossed and, where appropriate, indented with as many lines and characters as is necessary. In the event that the embossing or indenting operation is not deemed acceptable by verification, the motor 121 is actuated by the controller 3 to move the carriage 101 forward in the "Y" direction, and the motor 121 is actuated to move the carriage 101 rightwardly in the "X" direction to the position in front of the reject chute 603. After acceptable embossing, the motor 121 is actuated by the controller 3 which senses the final character embossed through the wheel position sensor 16 and the ram actuation sensor 15 to move the carriage 101 with the embossed blank card 2 thereon forward in the "Y" direction so as to line up with the card ejector latch 503 at the topper assembly 500. The motor 103 is then actuated to move the carriage 101 leftwardly in the "X" direction to hook up the ejector latch 503 with the pin 154 on the carriage roller 150, and thereafter the motor 121 is actuated to move the carriage 101 forwardly in the "Y" direction to pull the ejector latch forward and clear the previously topped card by causing it to waterfall from the ejector latch forward and into the ready position in the stacker channel. After this clearing operation has taken place, the motor 103 is actuated to move the carriage 101 leftwardly in the "X" direction into alignment with the topper platform 502 while at (which is permitted by the jog in the latch 503) the same time causing the card stacker linkage 604 (FIG. 19) to push the previous card just dropped from the topper platform past the spring retainer into the stacker channel 606 by means of the rectilinearly moved stacker plate 605. The motor 121 then is actuated to move the carriage 101 forward to open the clamping device 132 by means of the actuator 142 and thereafter reverses to move the carriage 101 adjacent to the topper platform whereupon the ram 519 is brought down to clamp the card on the topper platform 502. The motor 103 is activated to cause the carriage assembly 100 to move slightly further to the left in the "X" direction and actuate the card stacker linkage mechanism 604 (FIG. 19) so as to push the card just dropped from the topper platform into the stacker channel 606 by means of the stacker plate 605 pushed rectilinearly by the-carriage-actuated mechanism 604 to move the finished card past the spring retainer.

The motor 121 is now actuated to move the carriage 101 toward the front of the machine 10 in the "Y" direction to leave the embossed card held loosely on the carriage 101 on the topper platform 502 where the ram 519 has clamped it and topper action can now take place.

When the carriage 101 has moved sufficiently far forward in the "Y" direction to clear all the machine components, the motor 103 will be actuated to move the carriage 101 rightwardly in the "X" direction to the front of the new card supply hopper 201 for the pick-up of the next card and a repeat of the above-described cycle.

While we have shown and described several embodiments in accordance with the present invention, it is to be understood that certain details have not been described for sake of clarity and further that other changes and modifications are possible without departing from the concept of the present invention. For example, an empty card sensor can be utilized to prevent overflow of the cards when the stacker channel or the reject channel is full. Therefore, we do not intend to be limited to the details shown and/or described but rather intend to cover all changes and modifications encompassed within the scope of the appended claims.

We claim:

1. A carriage in a card embossing machine comprising:

means, attached to the carriage, for clamping a card thereon;

means for moving the carriage along a first axis between first and second sides of the machine;

a first stationary positioning motor operatively connected with and providing power to the means for moving the carriage along the first axis;

means for moving the carriage along a second axis transverse to the first axis;

a second stationary positioning motor operatively connected with and providing power to the means for moving the carriage along the second axis; and means for actuating the opening and closing of the means for clamping in response to motion of the carriage along the second axis with the means for actuating including at least one stationary actuator which is contacted by the means for clamping during motion along the second axis to cause the opening of the means for clamping and another stationary actuator which is contacted by the means for clamping during motion along the second axis to cause the closing of the means for clamping.

2. A carriage in a card embossing machine according to claim 1 wherein:

the means for moving the carriage along the first axis has a blade connection slidably connecting the means for moving the carriage along the first axis and the means for moving the carriage along the second axis throughout all movement along the first axis and the second axis.

3. A carriage in a card embossing machine according to claim 1 wherein:

the means for clamping includes a fixed jaw, a movable jaw pivotally connected with the fixed jaw, and means for biasing the movable jaw toward the fixed jaw.

4. A carriage in a card embossing machine according to claim 2 wherein:

the means for clamping includes a fixed jaw, a movable jaw pivotally connected with the fixed jaw, and means for biasing the movable jaw toward the fixed jaw.

5. A carriage in a card embossing machine in accordance with claim 1 wherein:

all power for opening and closing the means for clamping is provided from the second stationary positioning motor causing the carriage and means for clamping to move along the second axis to cause contact of the means for clamping with the at least one stationary actuator and the another actuator.

6. A carriage in a card embossing machine in accordance with claim 2 wherein:

all power for opening and closing the means for clamping is provided from the second stationary positioning motor causing the carriage and means for clamping to move along the second axis to cause contact of the means for clamping with the at least one stationary actuator and the another actuator.

7. A carriage in a card embossing machine in accordance with claim 3 wherein:

all power for opening and closing the means for clamping is provided from the second stationary positioning motor causing the carriage and means for clamping to move along the second axis to cause contact of the means for clamping with the at least one stationary actuator and the another actuator.

8. A carriage in a card embossing machine in accordance with claim 4 wherein:

all power for opening and closing the means for clamping is provided from the second stationary positioning motor causing the carriage and means for clamping to move along the second axis to cause contact of the means for clamping with the at least one stationary actuator and the another actuator.

9. A carriage in an embossing machine in accordance with claim 1 wherein:

the carriage and means for clamping have first and second ends of travel along the first axis;

the at least one stationary actuator comprises a first stationary actuator disposed at the first end of travel; and the another stationary actuator is disposed at the second end of travel.

10. A carriage in an embossing machine in accordance with claim 9 wherein:

the at least one stationary actuator further comprises a second stationary actuator disposed at the second end of travel.

11. A carriage in an embossing machine in accordance with claim 2 wherein:

the carriage and means for clamping have first and second ends of travel along the first axis;

the at least one stationary actuator comprises a first stationary actuator disposed at the first end of travel; and the another stationary actuator is disposed at the second end of travel.

12. A carriage in an embossing machine in accordance with claim 11 wherein:

the at least one stationary actuator further comprises a second stationary actuator disposed at the second end of travel.

13. A carriage in an embossing machine in accordance with claim 3 wherein:

the carriage and means for clamping have first and second ends of travel along the first axis;

the at least one stationary actuator comprises a first stationary actuator disposed at the first end of travel; and the another stationary actuator is disposed at the second end of travel.

14. A carriage in an embossing machine in accordance with claim 13 wherein:

the at least one stationary actuator further comprises a second stationary actuator disposed at the second end of travel.

15. A carriage in an embossing machine in accordance with claim 5 wherein:

the carriage and means for clamping have first and second ends of travel along the first axis;

the at least one stationary actuator comprises a first stationary actuator disposed at the first end of travel; and the another stationary actuator is disposed at the second end of travel.

16. A carriage in an embossing machine in accordance with claim 15 wherein:

the at least one stationary actuator further comprises a second stationary actuator disposed at the second end of travel.

17. A carriage in an embossing machine in accordance with claim 6 wherein:

the carriage and means for clamping have first and second ends of travel along the first axis;

the at least one stationary actuator comprises a first stationary actuator disposed at the first end of travel; and the another stationary actuator is disposed at the second end of travel.

18. A carriage in an embossing machine in accordance with claim 17 wherein:

the at least one stationary actuator further comprises a second stationary actuator disposed at the second end of travel.

19. A carriage in an embossing machine in accordance with claim 7 wherein:

the carriage and means for clamping have first and second ends of travel along the first axis;

the at least one stationary actuator comprises a first stationary actuator disposed at the first end of travel; and the another stationary actuator is disposed at the second end of travel.

20. A carriage in an embossing machine in accordance with claim 19 wherein:

the at least one stationary actuator further comprises a second stationary actuator disposed at the second end of travel.

21. A method of operating a card clamp carried by a carriage in a card embossing machine comprising:

moving the carriage along a first axis to stations of the card embossing machine disposed along the first axis to position a card clamped in the card clamp for processing at the stations and to move the carriage and card clamp to a position where the card clamp is opened to release the card clamped in the card clamp after processing at the stations and to a position where the card clamp is closed on another card to be embossed which is supplied from a card supply; and wherein the opening of the card clamp is produced by the card clamp contacting at least one stationary actuator during motion of the card clamp along a second axis; and the closing of the card clamp is produced by the card clamp contacting another stationary actuator during motion of the card clamp along the second axis.

22. A method of operating a card clamp carried by a carriage in an embossing machine in accordance with claim 21 further comprising:

providing all power for the opening and the closing of the clamp by a stationary motor causing driving the carriage and the card clamp along the second axis to cause contact of the card clamp with the at least one stationary actuator and the another actuator.

23. A method of operating a card clamp carried by a carriage in an embossing machine in accordance with claim 21 wherein:

the carriage and card clamp have first and second ends of travel along the first axis;

the at least one stationary actuator comprises a first stationary actuator disposed at the first end of travel;

the another stationary actuator is disposed at the second end of travel; and movement of the carriage and card clamp along the second axis causes the card clamp to contact the first actuator to open the clamp to release the card clamped in the card clamp and the card clamp to contact the another actuator to close the card clamp to clamp the another card.

24. A method of operating a card clamp carried by a carriage in an embossing machine in accordance with claim 23 wherein:

the at least one stationary actuator further comprises a second stationary actuator disposed at the second end of travel; and movement of card clamp and carriage along the second axis causes the card clamp to contact the second stationary actuator to open the clamp to release a rejected card clamped in the card clamp when the rejected card is detected by testing performed by the embossing machine.

25. A method of operating a card clamp carried by a carriage in an embossing machine in accordance with claim 22 wherein:

the carriage and card clamp have first and second ends of travel along the first axis;

the at least one stationary actuator comprises a first stationary actuator disposed at the first end of travel;

the another stationary actuator is disposed at the second end of travel; and movement of the carriage and card clamp along the second axis causes the card clamp to contact the first actuator to open the clamp to release the card clamped in the card clamp and the card clamp to contact the another actuator to close the card clamp to clamp the another card.

26. A method of operating a card clamp carried by a carriage in an embossing machine in accordance with claim 25 wherein:

the at least one stationary actuator further comprises a second stationary actuator disposed at the second end of travel; and movement of card clamp and carriage along the second axis causes the card clamp to contact the second stationary actuator to open the clamp to release a rejected card clamped in the card clamp when the rejected card is detected by testing performed by the embossing machine.

27. A method of operating a card clamp carried by a carriage in a card embossing machine comprising:

moving the carriage along a first axis in first and second directions to processing stations disposed along the first axis to position a card clamped in the clamp for processing at the processing stations and to move the carriage to a position where the clamp is closed on another card to be embossed which is supplied from a card supply;

opening the card clamp with the opening being produced by the card clamp contacting at least one stationary actuator during motion of the card clamp along the second axis; and closing the card clamp being produced by the card clamp contacting another actuator during motion of the card clamp along the second axis.

28. A method in accordance with claim 27 further comprising:

providing all power for the opening and the closing of the clamp by a stationary motor causing driving the carriage and the card clamp along the second axis to cause contact of the card clamp with the at least one stationary actuator and the another actuator.

* * * * *